United States Patent
Ito et al.

[11] Patent Number: 5,944,768
[45] Date of Patent: Aug. 31, 1999

[54] NAVIGATION SYSTEM

[75] Inventors: Yasunobu Ito; Mitsuhiro Nimura, both of Okazaki; Kihachi Hayashida; Seiji Hayashi, both of Anjo; Chihiro Hayashi, Kariya, all of Japan

[73] Assignee: Aisin AW Co., Ltd., Japan

[21] Appl. No.: 08/740,534

[22] Filed: Oct. 30, 1996

[30] Foreign Application Priority Data

| Oct. 30, 1995 | [JP] | Japan | 7-281780 |
| Nov. 2, 1995 | [JP] | Japan | 7-286110 |
| Nov. 30, 1995 | [JP] | Japan | 7-337992 |

[51] Int. Cl.$^6$ .................. G01C 21/00; G08G 1/0968
[52] U.S. Cl. .................. 701/200; 701/201; 701/208; 340/990; 369/32
[58] Field of Search .................. 701/200, 201, 701/208, 209, 210, 212; 369/21, 29, 30, 32, 33; 340/990

[56] References Cited

U.S. PATENT DOCUMENTS

| 4,954,959 | 9/1990 | Moroto et al. | 701/211 |
| 5,157,614 | 10/1992 | Kashiwazaki et al. | 701/200 |
| 5,463,605 | 10/1995 | Nishida et al. | 369/58 |
| 5,515,284 | 5/1996 | Abe | 701/202 |
| 5,544,087 | 8/1996 | Nakajima et al. | 701/200 |
| 5,608,635 | 3/1997 | Tamai | 701/209 |
| 5,614,895 | 3/1997 | Ohomori et al. | 340/995 |
| 5,633,842 | 5/1997 | Nishida et al. | 369/32 |
| 5,790,975 | 8/1998 | Kashiwazaki et al. | 701/208 |

*Primary Examiner*—Tan Nguyen
*Attorney, Agent, or Firm*—Lorusso & Loud

[57] ABSTRACT

A vehicular navigation system includes: a current position detection unit for detecting the current position of the vehicle; an information storage unit for storing map information for conducting route searching and for providing route guidance; an input unit for inputting a destination and inputting instructions for executing a search of the map information for a route from the current position detected by the current position detection unit to the destination; an output unit for outputting information for route guidance; and a central processing unit for temporarily memorizing a route detected by the route search and for outputting a signal to the output unit to provide route guidance according to the memorized route. The central processing unit judges whether or not one information storage unit has been replaced by another and, when replaced, if the destination has not been reached, conducts another route search from the current position to the destination.

7 Claims, 36 Drawing Sheets

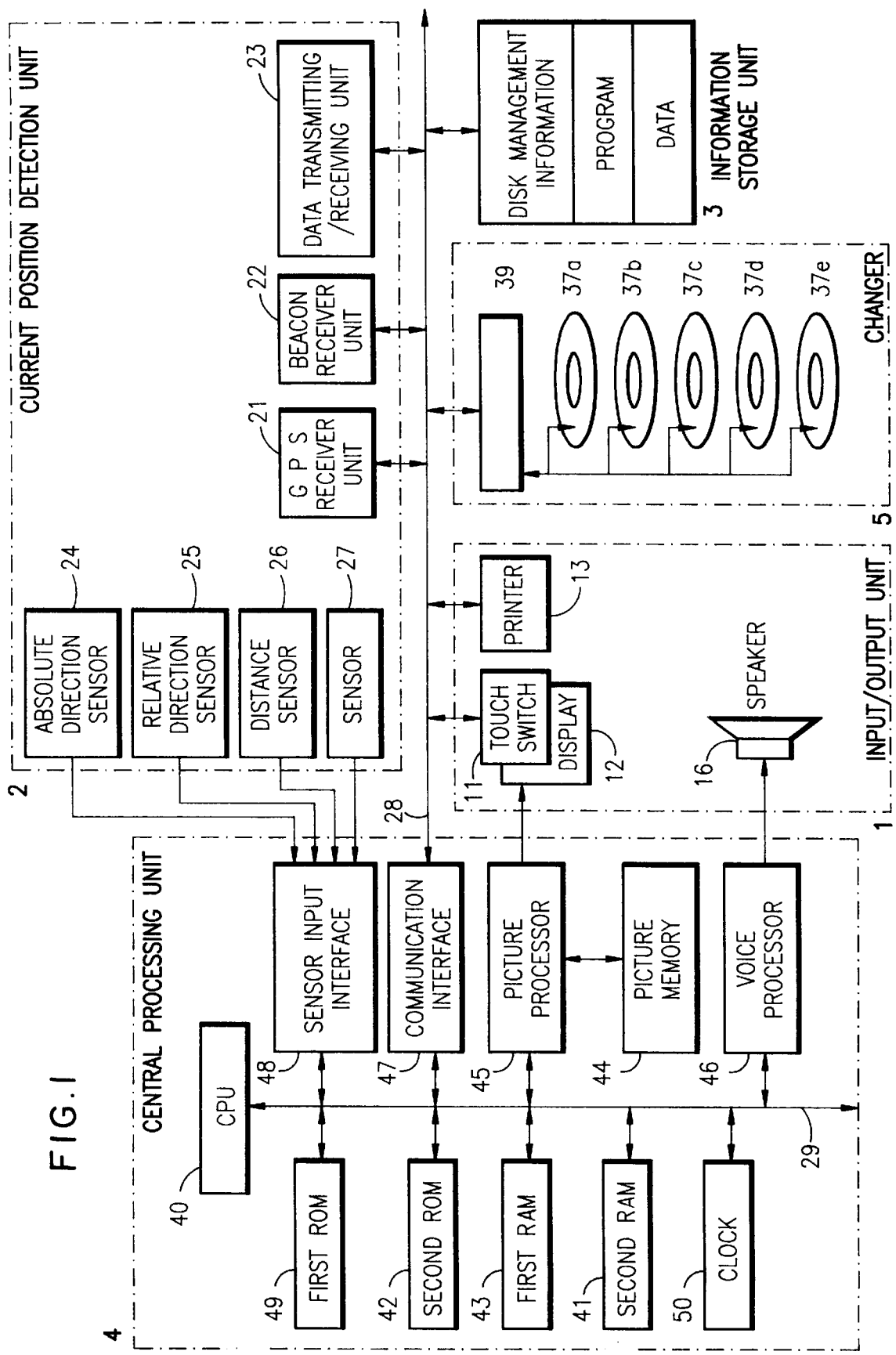

FIG.2A
Guidance road data

| Quantity of roads | | |
|---|---|---|
| 1 | Road number | |
| | Length | |
| | Road attribute data | |
| | Shape data address, size | |
| | Guidance data address, size | |
| | · | |
| | · | |
| | · | |
| | · | |
| | · | |
| | · | |
| n | | |
| | | |
| | | |

FIG.2B
Shape data

| Quantity of nodes | |
|---|---|
| 1 | East longitude |
| | North latitude |
| | · |
| | · |
| | · |
| m | |

FIG.2C
Guidace data

| Crossing name |
|---|
| Caution point |
| Road name data |
| Road name audio data address, size |
| Destination data address, size |

FIG.2D
Destination data

| Quantity of destinations | |
|---|---|
| 1 | Destination road number |
| | Destination name |
| | Destination name audio data address, size |
| | Destination direction data |
| | Traveling guidance data |
| | · |
| | · |
| k | |
| | |
| | |
| | |

FIG.2E
Destination direction data

| −1 : invalid |
|---|
| 0 : Unnecessary |
| 1 : Straight traveling |
| 2 : To the right |
| 3 : Obliquely to the right |
| 4 : Back to the right |
| 5 : To the left |
| 6 : Obliquely to the left |
| 7 : Back to the left |

FIG.3A
Road attribute data

Presence/absence information
Presence : ○

| | | |
|---|---|---|
| High level/ underground road data | High level road | |
| | Beside high level road | |
| | Underground road | ○ |
| | Beside underground road | |
| Quantity of lanes | Three lanes or more | |
| | Two lanes | ○ |
| | A single lane | |
| | No center line | |

FIG.3B
Road name data

| Road type | Road type internal number |
|---|---|

| | | |
|---|---|---|
| Express road | Trunk line | 1 |
| | Subsidiary | 2 |
| Urban express road | Trunk line | 3 |
| | Subsidiary | 4 |
| Toll road | Trunk line | 5 |
| | Subsidiary | 6 |
| General road { | National road | 7 |
| | Prefectural road | 8 |
| | Others | 9 |

FIG.4A

Caution point data

| Railroad crossing | ○ |
|---|---|
| Tunnel entrance | |
| Tunnel exit | |
| road with decreasing point | |
| none | |

FIG.4B

Traveling guidance data

| TO the right lane | |
|---|---|
| TO the left lane | |
| Center lane | ○ |
| none | |

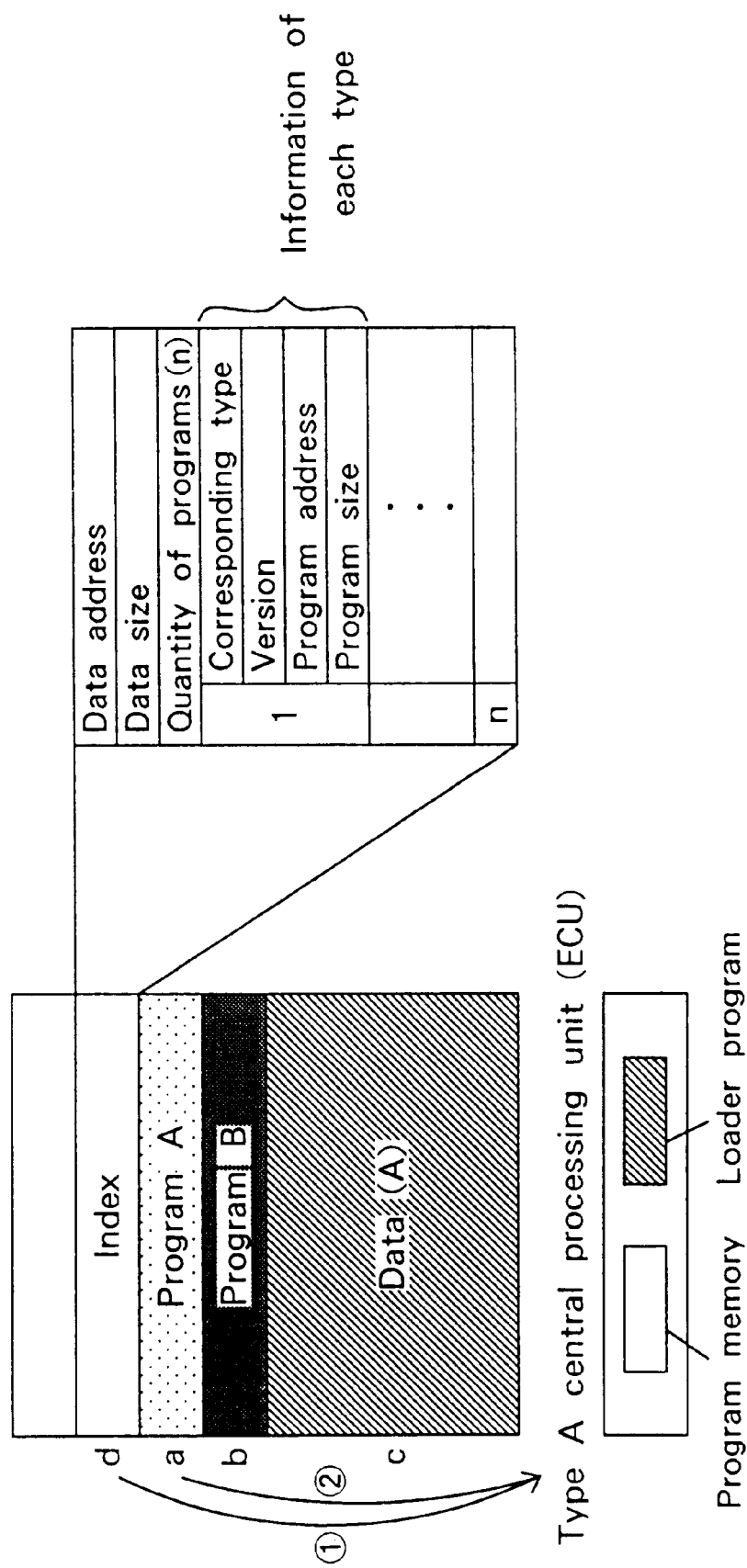

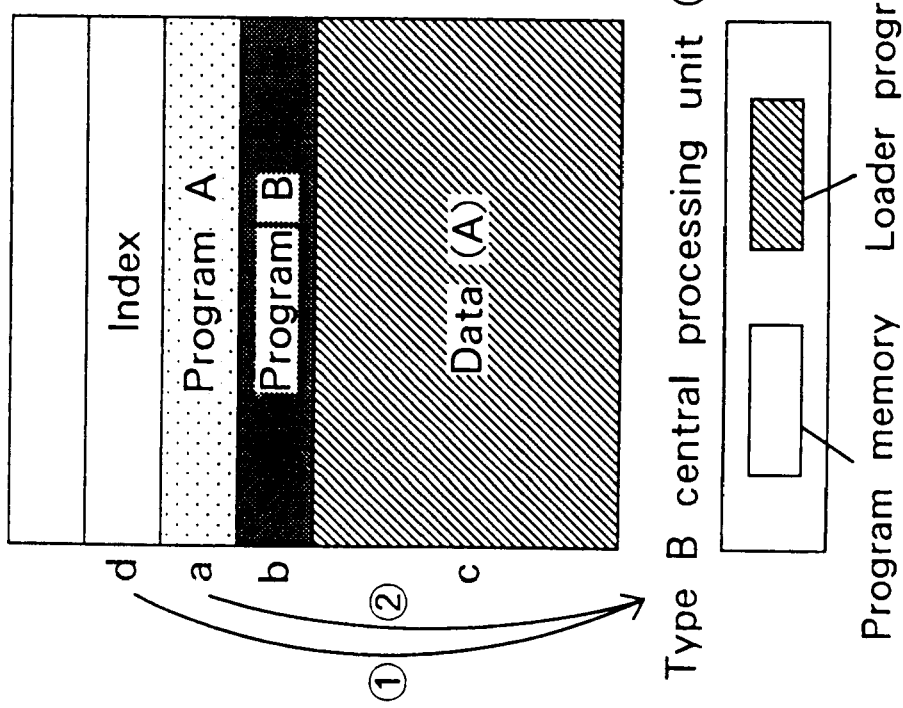

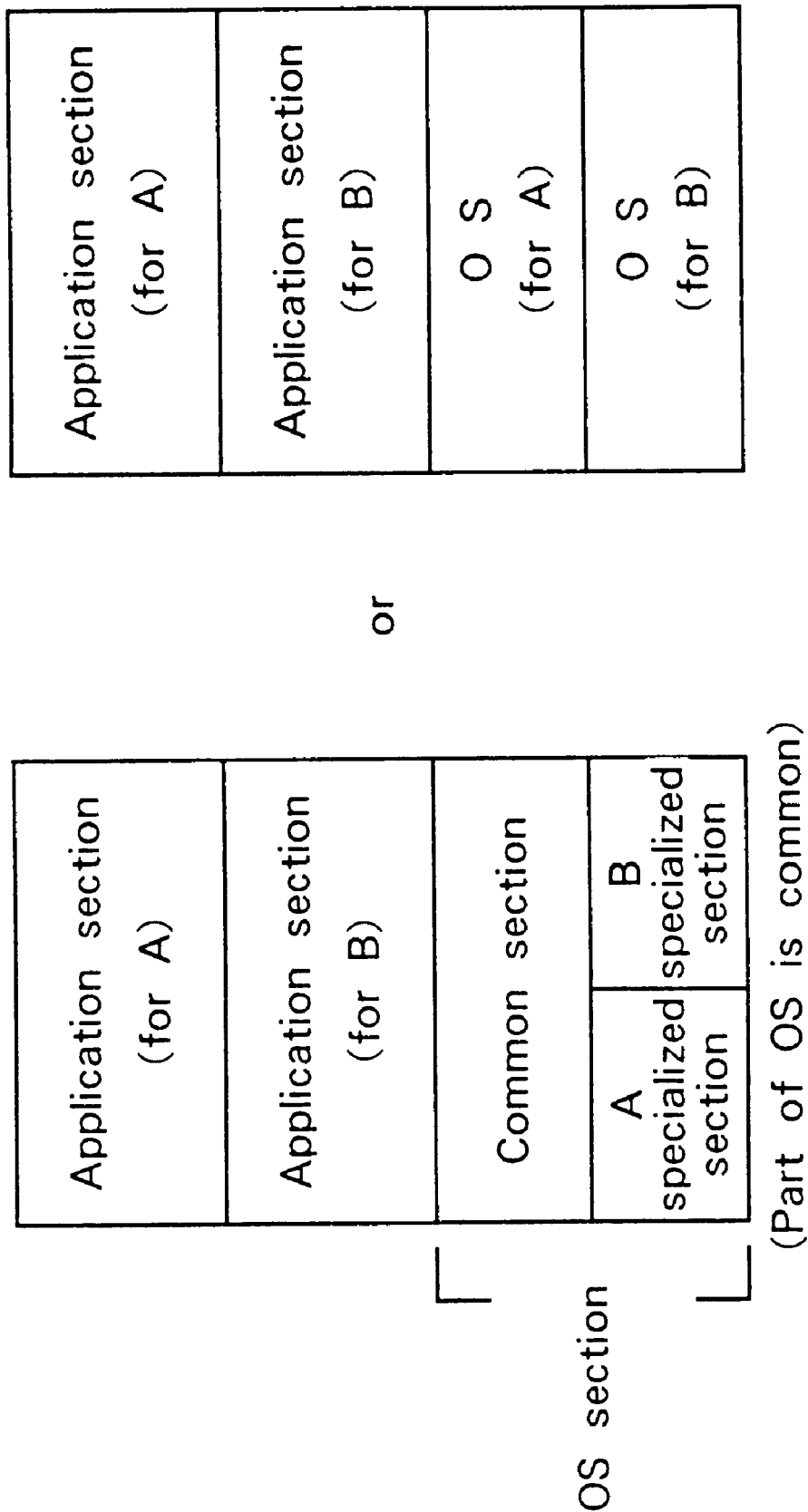
FIG.12a Between different types

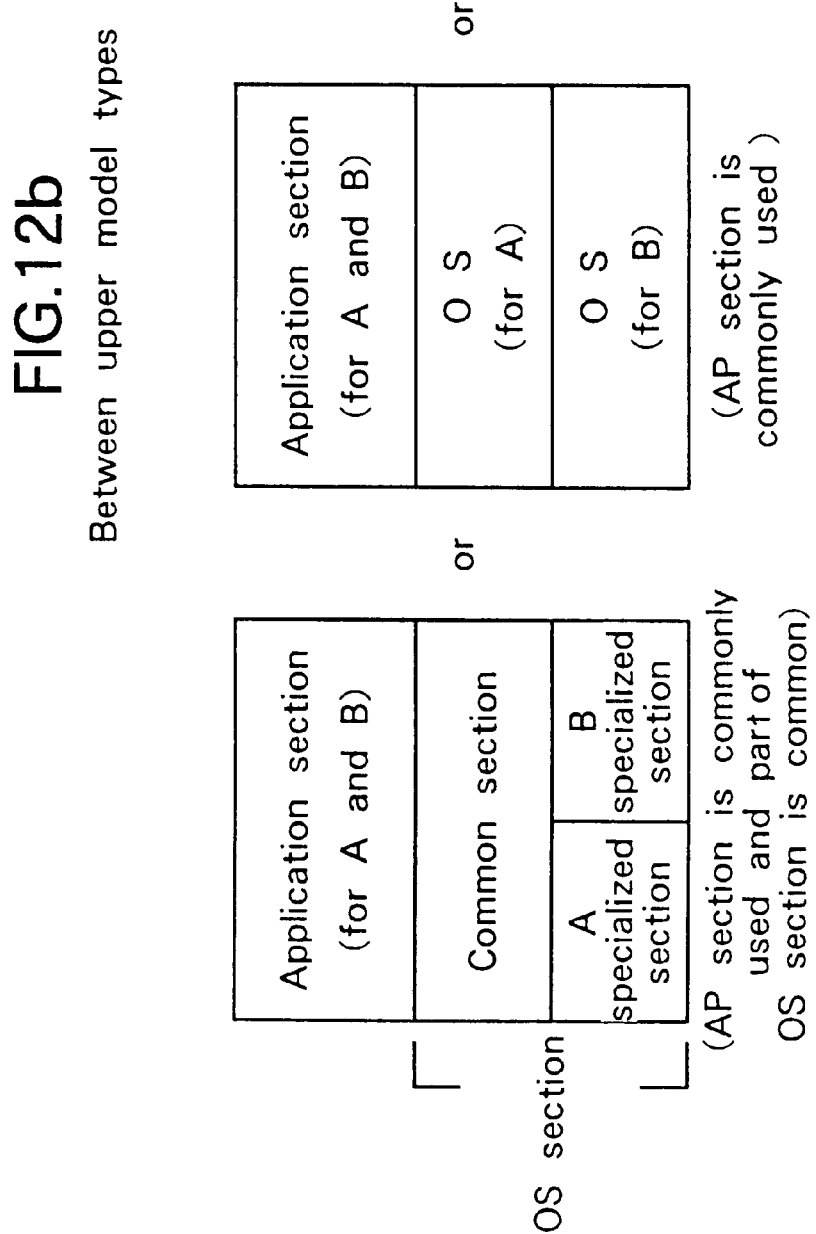
FIG.12b Between upper model types

FIG.14a
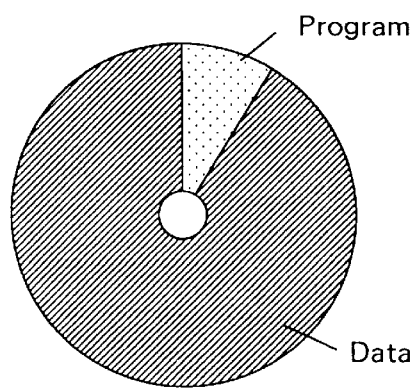
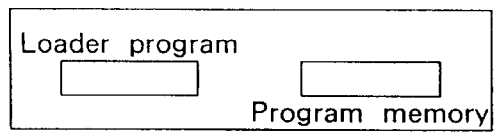
FIG.14b
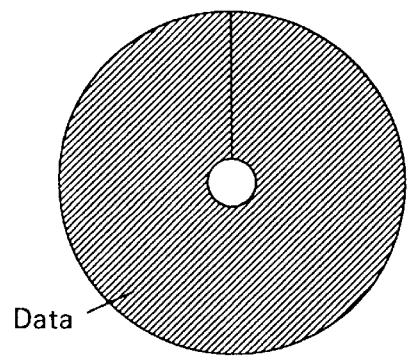
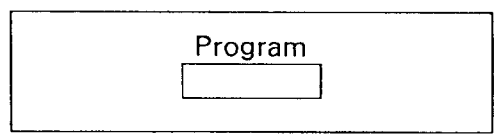

37
CD – ROM

| | |
|---|---|
| Map data file | 80a |
| Intersection data file | 80b |
| Node data file | 80c |
| Road data file | 80d |
| Photo data file | 80e |
| Destination data file | 80f |
| Guidance point data file | 80g |
| Detailed destination data file | 80h |
| Destination reading data file | 80i |
| Navigation program | 80j |
| Other data file | 80k |
| Coordinate range | 80m |

First RAM

| Program area PL |
| Current position MP |
| Absolute direction ZD |
| Relative direction D θ |
| Traveling distance ML |
| Current position information PI |
| VICS data VD |
| ATIS data AD |
| Registration destination data TP |
| Guidance start point data SP |
| Guidance final point data ED |
| Guidance route MW |
| Index quantity CKm |
| Index information IL (CKm) |
| Coordinate range ZP (CKm) |

Second RAM

| Accumulated use frequency LK (OP) |

FIG. 28

NAVIGATION SYSTEM

BACKGROUND OF THE INVENTION

1. Field of the Invention

The present invention relates to a navigation system which conducts route searching and route guidance to a predetermined destination.

2. Description of the Related Art

Various vehicle navigation systems which conduct route guidance to a destination from a point of departure or current position through passing points, with display and voice guidance, have been proposed. The typical vehicle navigation system stores guidance data in its information storage unit, inclusive of map data, data for features of crossings and passing points and display and voice data, searches the map data to determine an optimum route from the current or departure location to the destination (route search), and provides route guidance. Thus, the typical vehicle navigation system includes an input/output device for inputting and outputting information related to route guidance, a current position detection unit for detecting information relating to the current position of the vehicle, an information storage unit for storing navigation data necessary for determination of a route and display/voice guidance data or the like necessary for route guidance, and a central processing unit for conducting route search processing, display guidance processing necessary for route guidance, and control for the overall system.

Generally, the information storage unit, as shown in FIG. 13, includes indexed files of map data, search data, guidance data, map matching data, destination data and the like, i.e. provides a database storing all data necessary for the navigation system. As an actual storage medium, a CD-ROM is often used for this purpose. The stored navigation programs will include both OS (operating system) and application programs. The application programs include a map drawing program, route search programs, route guidance programs, current position calculation programs, and destination setting operation control programs. The map drawing program, the route search program, the route guidance program, the current position calculation program, and the destination setting operation control program are executed utilizing map data, search data, guidance data, map matching data and destination data, respectively. Because the current position calculation program can calculate a current position using map data, by using the same map data for the map drawing program and for the current position calculation program, omitting duplication of map data, it is possible to reduce the total amount of data.

The present position calculation section detects current location position by comparing direction information and distance information obtained from signals of the relative direction sensor, the absolute direction sensor and the distance sensor with map data or map matching data. Responsive to input of the destination or to an instruction to execute a route search, the route search program is executed to search for an optimum route using map data. When guidance is started, the route guidance section displays a map indicating direction of travel relative to the current location, outputs remaining distance to an intersection, identifies a feature or point being passed, travel direction at an intersection, information pertaining to the identified feature or point, utilizing guidance data associated with the determined route, by visual display and voice.

The conventional vehicle navigation systems are generally classified as one of two types. In one type, as shown in FIG. 14(b), only data is stored in a CD-ROM, while application and OS programs are stored in a ROM of the central processing unit. In a second type, shown in FIG. 14(a), a program and data are stored in a CD-ROM and a program memory area consisting of a RAM or a flash memory is provided in the central processing unit to read a program each time it is required.

The navigation map storage media may include a map for the entire country (nation-wide map) stored in a single storage medium, local map storage media for each local area, with the entire country covered by a plurality of such local map storage media and sightseeing map storage media in which additional information such as tour guidance is added for a particular area. To provide these different map media with compatibility so they can be processed in the same apparatus, data format is usually standardized. However, any of the following circumstances may be encountered:

(1) The format for stored data is different as between the different storage media;

(2) Although the format of the stored data is the same, map information such as position coordinates, name and shape is different; or (3) The format of the stored data, and data type and contents such as position coordinates, name and shape are all in conformance with a uniform standard.

However, because as mentioned above, the data media include a nation-wide version, local versions and genre-based versions (for sightseeing, leisure, and the like), and because some local versions represent different geographic divisions, and a given program is provided with a plurality of data CD-ROMs, if the CD-ROM is changed, destination and search conditions (express road priority or the like) must be reset and an instruction for execution of route search must be input, which operations required of the user have proven inconvenient. Even in the case of identically formatted local versions, if they are developed separately, even if they use the same coordinates, information as to road numbers, intersection and exit numbers and search conditions may be different. Additionally, because a guidance route is usually memorized in the form of road numbers and intersection/interchange/exit numbers, if the CD-ROM is replaced after the guidance route has been determined by route search and memorized, the route search function becomes disabled.

Further, with regard to the above-classified three different sets of circumstances, in case (1), a new disk replacing the former disk cannot be activated. In case (2), although the disk can be activated because its data format is the same, because the data content is different it is impossible to provide guidance for a route determined before the new disk was read. In case (3), although it seems that route guidance before the disk is replaced is possible because the data style and content are based on the same standard, because the data content is different, it is impossible to provide complete compatibility. For example, a road which exists in a local version may not exit in a nation-wide version. Thus, to receive appropriate route guidance, each time a disk is replaced, it is necessary to again set a destination, to again set a search condition and to repeat the process of route determination from the beginning, at an inconvenience to the user.

In conventional navigation systems, by changing the CD-ROM between various CD-ROMs for different geographic areas, purpose or genre, such as for sightseeing, golf, and the like, it is possible to achieve smoother and more comfortable guidance. Thus, a plurality of the CD-ROMs are typically stored in a single case so that the CD-ROM from which information is to be read, at the command of a user, can be changed manually.

However, in a conventional navigation system in manually changing the CD-ROMs from which information is to be read, among a plurality of stored CD-ROMs, no attention is paid to the information content of the CD-ROMs. For example, in using a navigation system in which five CD-ROMs are stored, a CD-ROM in the first position of the changer is moved to an optical head and by the next command for change, the second CD-ROM is moved to the optical head. In this manner, only a mechanical change is performed.

In other words, the conventional navigation system does not automatically take into account the information stored in the CD-ROMs when changing CD-ROMs. Thus, by a manual change command through a switch input, a new CD-ROM is set on the optical head and information of this CD-ROM is read and its contents are displayed on the display screen. Then, the user can judge whether or not the new CD-ROM is that desired. Therefore, if the replaced CD-ROM is not that desired, the user must again input a CD-ROM change command to the navigation system, a very troublesome procedure.

Thus, in the prior art system, in changing CD-ROMs, the new CD-ROM to be selected cannot be identified with certainty and the desired CD-ROM cannot be selected rapidly. Because a sightseeing CD-ROM, a leisure CD-ROM, a golf CD-ROM and/or a detailed road map information storage CD-ROM for the same area are all present in the changer, even if the road map information recorded on the CD-ROMs is the same, the user may become confused as to which CD-ROM should be selected and must confirm the contents of all the CD-ROMs.

In addition, the changing of CD-ROMs is accompanied by two large time lags, the time required to mechanically move the new CD-ROM to the optical head and the time required to read information from the CD-ROM and to display it on the display screen. Thus, in a navigation system employing a plurality of CD-ROMs which may be loaded, selecting a CD-ROM appropriate for the current location and type of destination is very difficult for the user.

In a navigation system in which only a single CD-ROM can be loaded, the user has to replace the CD-ROM manually. Thus, if the vehicle moves from the geographical range of one local version CD-ROM across to the geographical range of another local version CD-ROM, the user must replace the CD-ROM while the vehicle is moving. Such replacement of the CD-ROM is not easy during movement of the vehicle. In addition, when the CD-ROM is replaced, a route re-search must be conducted based on road information contained in the new (replacement) CD-ROM. Thus, the navigation guidance is stopped for a specific time just after the replacement.

SUMMARY OF THE INVENTION

Accordingly, an object of the present invention is to solve the above-described problem and, in particular, to enable route guidance without need for a new route search upon changing a CD-ROM.

Thus, the present invention provides a navigation system for conducting route search to determine an optimum route to a designated destination and for providing route guidance. The navigation system of the present invention includes: a current location detection unit for detecting the current (present) location of the vehicle; a removable information storage unit (external) for storing map and other route information for conducting route search and for providing route guidance; an input unit for inputting a destination and inputting an instruction to execute a route search of the stored map information in one information storage unit to determine an optimum (guidance) route from the current location detected by the aforementioned current location detection unit to the input (designated) destination; an output unit for outputting information for route guidance; and a central processing unit for temporarily memorizing the route determined by the route search and for outputting a signal to the output unit to provide route guidance according to the memorized route. The central processing unit judges whether or not the information storage unit has been replaced and, in response to detection of the replacement of the one information storage unit by another, retains in memory at least a portion of the data associated with previously determined guidance route if the destination has not yet been reached and conducts a route search from the current position to the destination based on the retained data and the map data contained in the new information storage unit.

According to another aspect of the present invention, there is provided a navigation system in which the information storage unit stores programs for conducting the route search and route guidance and the central processing unit includes an internal storage means for storing the programs which, if the program of a new (replacement) information storage unit is different from that of the information storage unit which it replaces, stores the former program in internal storage means. The central processing unit memorizes a search condition and a guidance route and if a guidance route to a destination has not been terminated is stored when the aforementioned information storage unit is replaced, conducts a route search from the current position to the destination based on the aforementioned search condition.

According to the present invention, replacement of a CD-ROM is detected, and if a guidance route in which a guidance up to its destination has not been completed is memorized, route search is conducted from the current position to the destination responsive to detection of replacement of one CD-ROM with another. Therefore, once instructions for route search and route guidance have been issued by inputting the location of the destination, it is not necessary to re-enter the destination or the like or to instruct a new route search each time the CD-ROM is replaced in order to receive route guidance to the destination. Further, replacement of the CD-ROM is detected, in the case when a program stored in the CD-ROM is written into an internal RAM or flash memory for startup, it is possible to also utilize a program on the new CD-ROM by writing the program into memory.

A further object of the present invention is to provide a navigation system in which a plurality of CD-ROMs are loaded and which is capable of automatically and rapidly selecting a CD-ROM for use in navigation. Therefore, in another embodiment the present invention provides a navigation system comprising a plurality of external information storage units, e.g. CD-ROMs, each a different degree of specificity with regard to map information, and wherein an external information storage unit in current use may be replaced by an external information storage unit means having more detailed map information pertaining to the current location of the vehicle. Thus, in this latter embodiment, the present invention provides a vehicle navigation system including: current location detecting means for detecting the current location of the vehicle; a plurality of external information storage media for storing map information; management means for managing the external information storage media; control means for selecting at least one of the information storage media corresponding to the current location of the vehicle by comparing information in the plurality of the information storage media managed by the management means with information for the current location of the vehicle; and means for changing to another selected external information storage medium.

According to a further aspect, the present invention provides a vehicle navigation system including: current location detecting means for detecting the current location of a vehicle; a plurality of removable information storage media for storing map information; management means for managing the removable information storage media; control means for selecting one of the removable information storage media corresponding to the current location of the vehicle by comparing information in the plurality of the removable information storage media managed by the management means with information for the current location of the vehicle; a first map information storage means for memorizing route information corresponding to the current location of the vehicle on the basis of map information stored in the first removable information storage medium; means for changing from an external information storage medium, other than the first removable information storage medium selected by said control means, to a second removable information storage medium corresponding to the current location of the vehicle; a second map information storage means for memorizing route information corresponding to the current location of the vehicle on the basis of map information stored in said second removable information storage medium; changeover means for changing map information responsive to a changeover request; and output means for changing from the first map information storage means to the second map information storage means when a changeover request is dispatched from said changeover means and outputting route information of the second map information storage means.

A map information storage means, in which the coordinates of the detected current location of the vehicle are included in the geographical coordinate range of its stored map information, is selected from the plurality of the map information storage means and then map information is read out from that selected storage means and displayed. Further, map information storage means in which the category (field), purpose or genre of an input destination is included in its stored map information may be selected from the plurality of map information storage means and its map information read out and displayed.

As described above, in the navigation system mounted on a vehicle according to the present invention, a CD-ROM which is appropriate for the current location of the vehicle is selectable so that it is possible to provide guidance information properly, in response to a request from a user.

Further, by judging that, during travel of a vehicle with guidance of a nation-wide version CD-ROM, the vehicle is approaching the map area of a local version CD-ROM, and by preliminarily reading information of the local version CD-ROM and memorizing route information up to a destination in a storage means, responsive to such a judgement, for example, RAM or the like, when a user requests to change to a detailed local version CD-ROM, it is possible to immediately change over to the required map information thereby providing timely information and improving operation efficiency.

Still further, it is possible to provide guidance in accordance with a specific interest of the user, e.g. a ski guide CD-ROM, sightseeing CD-ROM or the like, as well as map disks and to accurately select a CD-ROM suitable for the current location and destination of the vehicle.

BRIEF DESCRIPTION OF THE DRAWINGS

FIG. 1 is a block diagram showing an entire embodiment of a vehicle navigation system according to the present invention.

FIGS. 2A–2E illustrate examples of major data files stored in the information storage unit.

FIGS. 3A and 3B illustrate additional examples of major data files stored in the information storage unit.

FIGS. 4A and 4B illustrate other types of major data files stored in the information storage unit.

FIGS. 8a and 8b illustrate the relationship between the contents of the CD-ROM and a loader program prepared in the central processing unit.

FIGS. 12a and 12b illustrate various examples of different arrangements (combinations) of application and OS programs as stored on the CD-ROM.

FIGS. 14a and 14b are diagrams illustrating correspondence between storage information on a CD-ROM utilized in a conventional vehicle navigation system and its central processing unit (ECU).

FIG. 24 is a diagram showing the types of information files recorded on the CD-ROM 37.

FIG. 27 is a diagram showing a part of a data group memorized in the first RAM 5.

FIG. 28 is a diagram showing a data group to be written into the second RAM 6.

DESCRIPTION OF THE PREFERRED EMBODIMENTS

Figure 5:
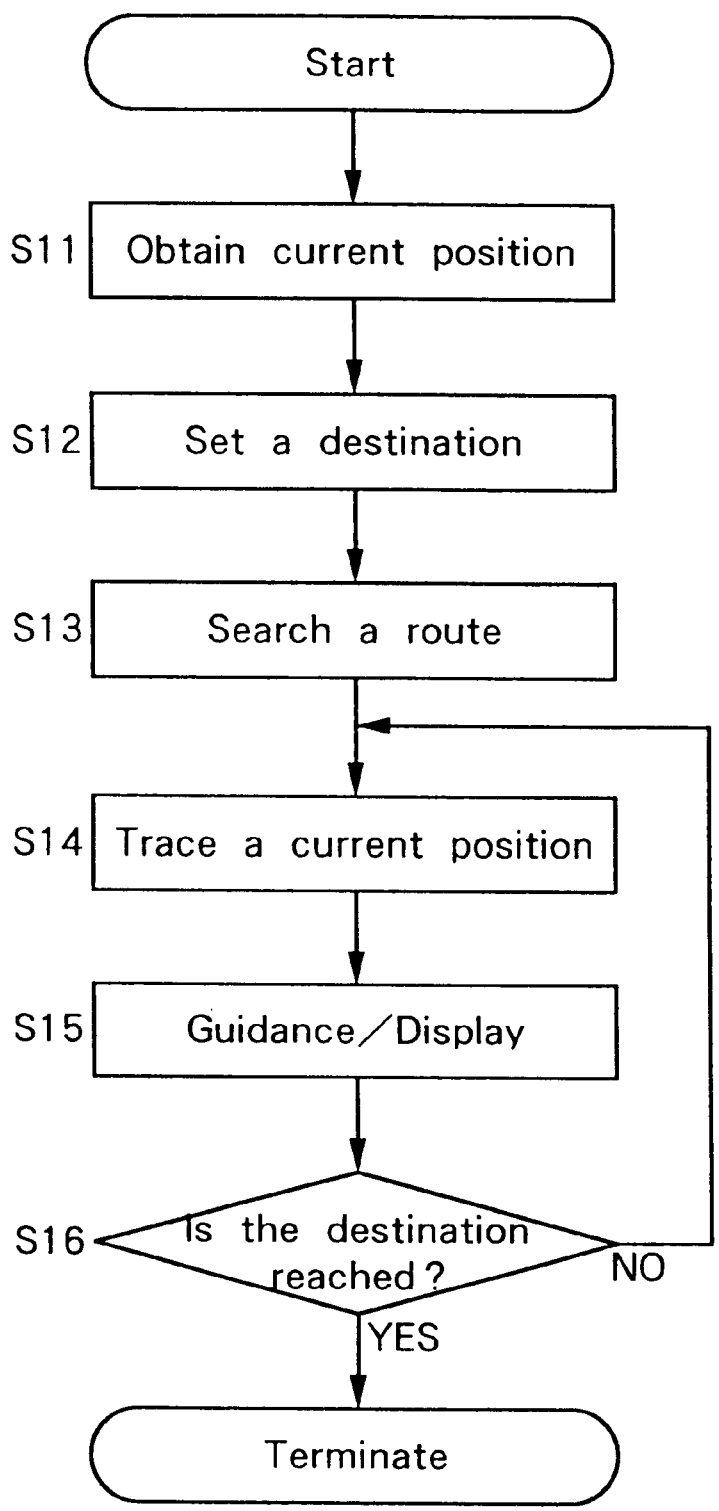
FIG. 5 is a flow chart of the main routine for operation of the navigation system in accordance with the present invention.

Preferred embodiments of the present invention will now be described with reference to the accompanying drawings.

FIG. 1 shows an embodiment of a the navigation system according to the present invention including an input/output unit 1 for inputting and outputting information for route guidance, a current location detecting unit 2 for detecting information concerning the current location of the vehicle, an information storage unit 3 for storing navigation data necessary for determining a route, visual/audio guidance data necessary for guidance along the determined route and programs (application and/or OS), and a central processing unit 4 for controlling the entire system.

A changer 5 holds a plurality of removable storage media 37a–37e (CD-ROMs) and is provided with a data transmitting/receiving section 39 which includes an optical head for reading the removable storage media 37a–37e.

The input/output unit 1 has a function for instructing the central processing unit 4 to provide navigation processing at a driver's disposal such that the guidance information can be output audibly and/or through a display screen when the driver so requests, with additional output of processed data through a printer. As a means for achieving that function, the input section includes a touch switch 11 or operation switches for entering a destination by telephone number or coordinates on a map and for requesting route guidance. Of course, a remote controller may be used as an input device instead. The output section of unit 1 includes a display 12 for automatically displaying route guidance on the screen in response to a driver's request, a printer 13 for printing data processed in the central processing unit 4 and/or data stored in the information storage unit 3, and speakers for outputting the route guidance audibly.

A voice recognition device which enables voice input or a recording card reading device for reading data written in an IC card or a magnetic card may be added to the system. It is also possible to add a data communication device for data exchange with a remote information source such as an information center which stores data necessary for navigation and supplies such data through a communication line in response to a driver's request or with an electronic notebook in which data customized for the driver, such as map data and destination data, is stored.

Display 12 is a color CRT or a color liquid crystal display and outputs all screens necessary for navigation, such as a route setting screen, based on map data and guidance data processed by the central processing unit 4, an interval map screen and an intersection map screen in color, and further displays buttons (switches) in the screen for setting route guidance and for switching guidance or screens providing route guidance.

This display 12 is mounted in an instrument panel in the vicinity of the driver's seat. The driver recognizes the current location of his vehicle by watching the interval map and obtains information for the route which he will follow. The display 12 is provided with touch switches 11 corresponding to the indications of the function buttons. Touching the touch switch 11 executes the above-mentioned operation based on a corresponding signal input. The input signal generation means, comprising this button and the touch switches, constitutes the input section.

The current location detecting unit 2 comprises a GPS receiver unit 21 utilizing a global positioning system (GPS), a beacon receiver unit 22, a data sending/receiving unit 23 for receiving a GPS compensation signal using, for example, a cellular phone or FM multiplex signal, an absolute direction sensor 24 in the form of, for example, a geomagnetic sensor, a relative direction sensor 25 in the form of a wheel sensor, a steering sensor, a gyroscope or the like, and a distance sensor 26 for detecting travel distance according to the number of revolutions of a wheel.

The information storage unit 3 stores a program and data for navigation. The program comprises a map drawing section, route search section, route guidance section, a current position calculation section, a destination setting operation control section and the like, and includes application programs for signal output processing for navigation, operating system programs and the like. A program for route searching, programs for display output control necessary for route guidance and audio output, data necessary therefor and display information data necessary for route guidance and map display are stored therein. The stored data includes files of map data, search data, guidance data, map matching data, destination data and the like and all data necessary for operation of the navigation system.

The central processing unit 4 comprises a CPU 40 for executing various arithmetic operations, a flash memory which is a second RAM 41 for reading a program from a CD-ROM loaded into the information storage unit 3 and storing it, a ROM 42 for storing a program in the flash memory 41, a RAM 43 for temporarily storing route guidance information such as a location coordinates of a set destination, road name code No. and the like and data currently used in an arithmetic operation, picture memory 44 for storing picture data for use in the display, a picture processor 45 for retrieving picture data from the picture memory 44 on the basis of a display output control signal from the CPU 40, processing the data and outputting it to the display, a voice processor 46 for synthesizing voice, phrases, complete sentences, sounds and the like from data read out from the information storage unit 3, on the basis of an audio output control signal from the CPU, by conversion of the read data into analog signals for output to a speaker 16, a communication interface 47 for handling input and output data in communication with a remote station, a sensor input interface 48 for receiving a sensor signal from the current location detecting unit 2, and a clock 49 for entering date and time into internal diagnostic information. In this embodiment route guidance is provided in the form of screen display and, optionally, voice output if selected by the driver.

FIGS. 2–4 show major data files stored in the information storage unit 3. FIG. 2(A) shows a guidance road data file obtained by route search and stored as data necessary for route guidance. The guidance road data file includes road numbers, lengths, road attribute data and shape data address and size, of each of the quantity of roads n, and guidance data address and size.

A road number is specified for each road section between junctions and for each direction (outbound and inbound). The road attribute data is road guidance subsidiary information data, which provides information about elevated and underground roads, e.g. as to whether a road is elevated, beside an elevated road, an underground road, or beside an underground road, and information as to the number of lanes. When the shape data is divided by a plurality of nodes for each road as shown in FIG. 2(B), the respective node number m has coordinate data for its east longitude and north latitude. The guidance data comprises intersection (or access/exit point) names, caution point data, road name data, road name audio data address and size and destination data address and size, as shown in FIG. 2(c).

Caution point data includes information as to whether or not the caution point is a railroad crossing, tunnel entrance, tunnel exit, or road narrowing (lane merge) point and data for providing a caution message to a driver for a railroad crossing, a tunnel or the like, other than a junction or intersection, as shown in FIG. 4(A). The road name data is, as shown in FIG. 3(B), data providing information about road type such as express road, urban highway, toll road, general road (national road, prefectural road, other) and data showing a trunk line or feeder road for an express highway, urban highway and/or toll road, comprising road type data and road type internal number which identifies each road type. The destination data, as shown in FIG. 2(D), comprises destination road number, destination name, and destination name audio data address and size, destination direction data and travel guidance data.

The destination direction data, as shown in FIG. 2(E), is data for information for, invalid (no destination direction data is used), unnecessary (not guided), straight travel, to the right, obliquely to the right, back to the right, to the left, obliquely to the left and back to the left. The travel guidance data, as shown in FIG. 4(B), indicates which lane a vehicle should travel if there are a plurality of lanes and this data translates into information as to right lane, left lane, center lane or none.

Figure 6:
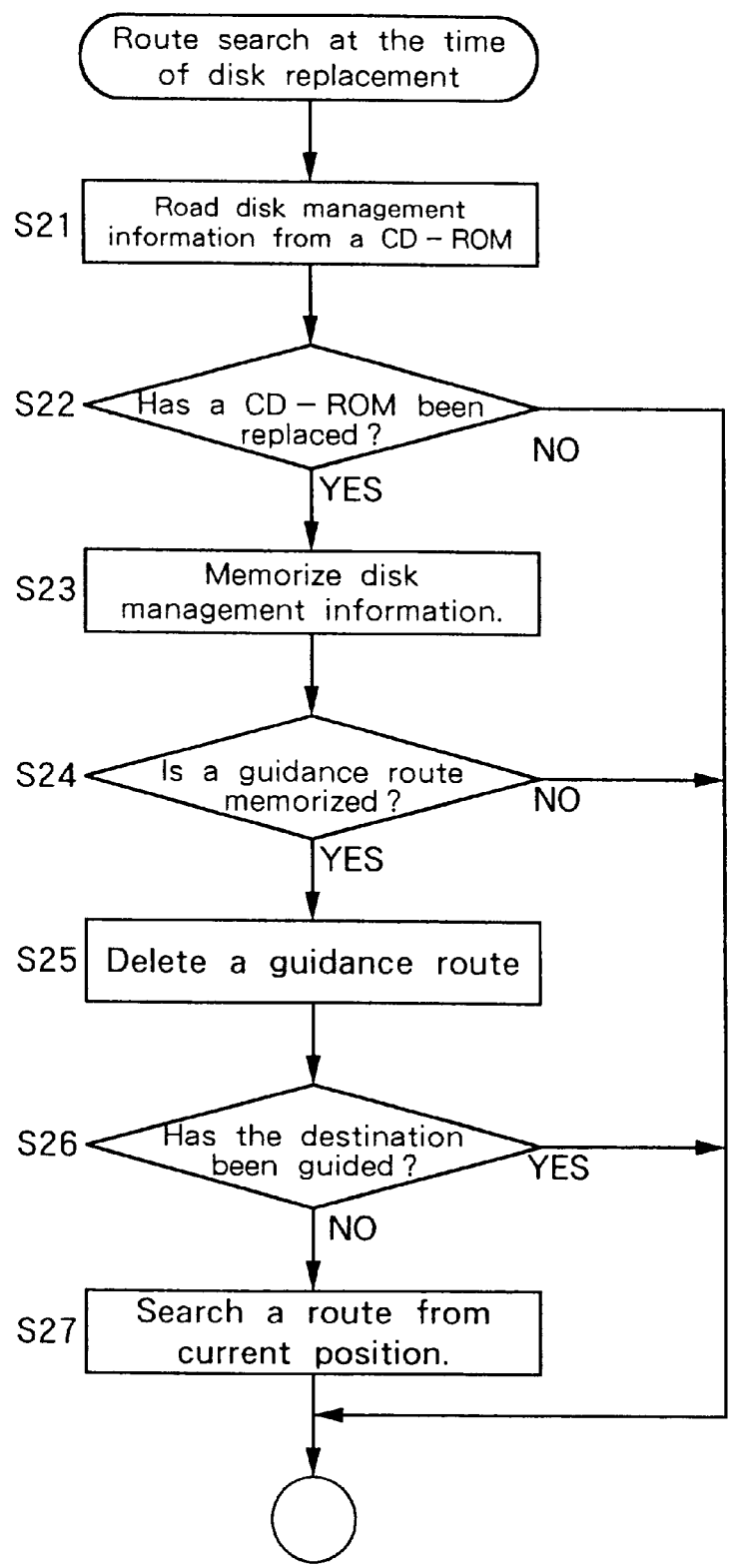
FIG. 6 is a flow chart of a route search routine executed at the time of disk replacement.

The overall operation of the above-described navigation system is executed according to the steps shown in FIG. 5. First, a current location (point of departure) necessary for route search is obtained by the current location detecting unit (step S11). Next, a destination is set according to a destination input from the input device through the destination setting screen (step S12), and a route search is executed and then a guidance route thereby determined is memorized in a route storage means (step S13). If a guidance start instruction is input, route guidance control means starts route guidance, detects the current location of the vehicle through the current location detection unit and traces the current location (step S14). On the basis of a guidance route memorized in the route storage means, guidance information is output to an output device in the form of voice and/or visual display to provide route guidance (step S15). Then, by comparing the current location with a destination, arrival at the destination is judged (step S16), and if it is judged that the destination has been reached, the route guidance is terminated. According to the present invention, to cope with a replacement of a CD-ROM (information storage unit), a route search routine is executed at the time of disk replacement as shown in FIG. 6, by periodic interruption.

In the route search routine executed at the time of disk replacement, first, disk management information is read from a CD-ROM (step S21) and whether or not a CD-ROM has been replaced is determined from disk management information read at this time, as compared with previously memorized disk management information (retained data) (step S22). If it is judged that the CD-ROM has been replaced, the read disk management information is memorized and updated (step S23). Then, whether or not a guidance route has been memorized is determined (step S24) and if a guidance route has been memorized, that guidance route is deleted (step S25). Whether or not a destination has been already been reached is investigated (step S26) and if the destination has not been reached, a route search for a route from the current location to the destination is executed (step S27). If it is judged that the CD-ROM has been not replaced, if it is judged that no guidance route has been memorized, or if it is judged that the destination has been reached, this interruption processing is terminated.

Although the memory medium for storing data may be any type, e.g. disk type or cassette, in general, a disk type such as CD-ROM or DVD is preferred. The unit which reads data from such a disk type memory medium may be either a single type reading unit in which a single disk is stored and data is read or a changer type reading unit in which a plurality of disks are stored and disks are switched.

With the disk changer type reading unit, by storing a plurality of different disks in the unit, such as a nation-wide version, a local version and a sightseeing version, users can easily choose a disk which suits their purpose. For example, in long-distance traveling, a plurality of disks are sometimes needed to reach a destination from a current position. In this case, it is preferable to first receive route guidance by calculating a route using a nation-wide version disk and then to replace it with a local version disk or a sightseeing version disk having more information, when the vehicle approaches the destination.

Then, a changing of the disk is detected, and if it is judged that the disk has been changed, steps S21, S22, S23 are executed. In earlier systems, generally when a disk is changed, all information in the RAM is deleted; however, according to the present invention, the RAM in the unit is constructed such that the related route guidance information cannot be deleted. This construction enables use of the previous route information even after a disk change.

The central processing unit reads disk information from the disk when it recognizes that the disk has been changed, and compares and judges its format, sentence meaning, version and the like with those of the previous disk. If the format is recognized to be different, it determines the new format type and judges whether or not it can utilize formatted data of that type. If it is judged that it can utilize the new disk, navigation with a program corresponding to the new disk can be started. If it is not possible to utilize the new disk, the unit notifies the user of that fact. After the program is started, before any disk change, a route to the input destination is arithmetically determined according to the position coordinates and route search conditions dictated by destination and points to be passed. Because the disk can be replaced while retaining in memory information for the determined route, it is possible to omit procedures for calculation of destination, route and the like when the disk is replaced, so that complicated procedures at the time of disk replacement can be reduced. Additionally, by providing a means for judging the progress of route guidance before the disk replacement, if it is judged that the vehicle has already reached a destination, a guidance point or the like, only the interval of the determined route for which guidance has not yet been provided need be searched and guidance therefor provided, so that unnecessary route search processing can be eliminated and search time can be reduced.

It is permissible to store a plurality of programs in the information storage unit 3, obtained from CD-ROMs or other sources. The capability of storing a plurality of programs in the unit eliminates the necessity of storing those programs in an external memory means (e.g., a disk) and thereby increases the capacity for storing various data necessary for route guidance. With this feature, if the disk is changed, the previously activated program is first compared and judged. If it has a format different from the format of the new disk, whether or not that new disk can be activated is judged against other programs stored in the unit, step by step. As a result, if a program which can start that disk is found, operation with the new disk is started. If a program is required from outside, by using a rewritable ROM, for example, EPROM, EEPROM, flash memory or the like as a memory for storing programs of the unit, the contents of the new disk are compared and judged against the previously activated program. If it is judged that it has been replaced with a disk having a different format, by rewriting the program, it is possible to start operation with the new disk.

Figure 13:
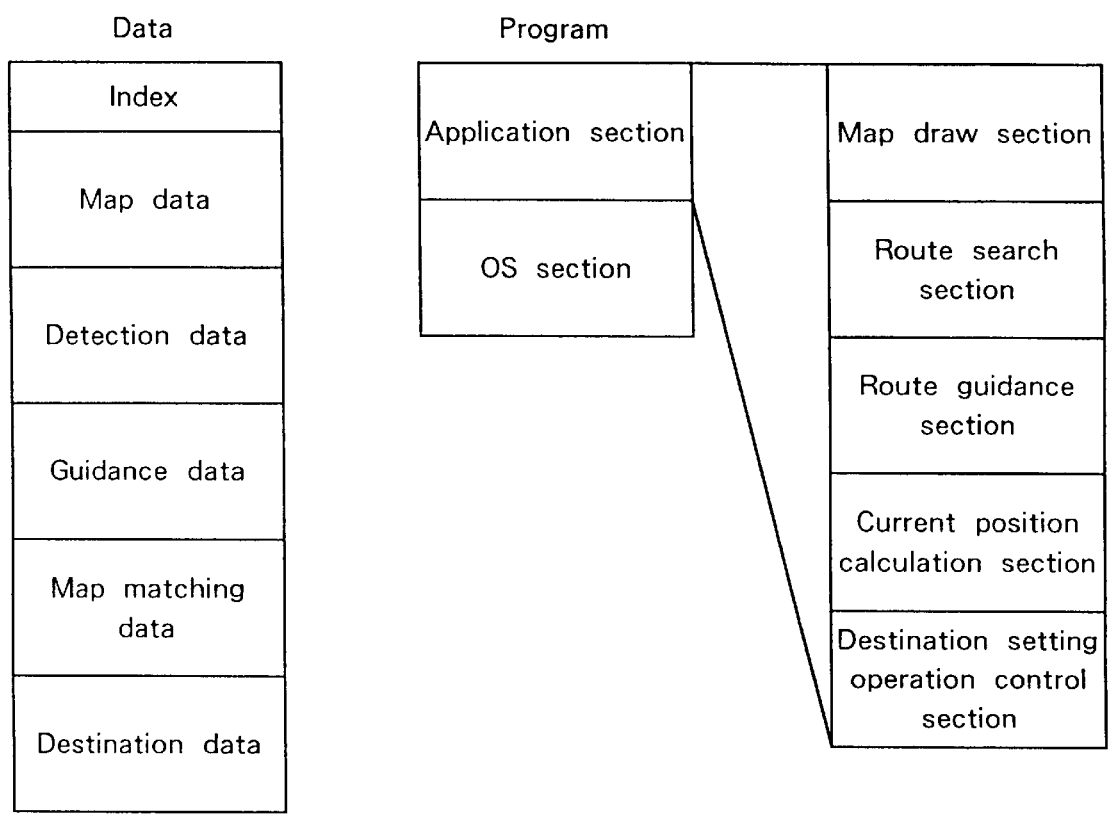
FIG. 13 is a diagram illustrating arrangement of application programs and data utilized for navigation.

The systems described above include the type in which only data is stored in a CD-ROM and application and OS programs are stored in a ROM of the central processing unit as shown in FIG. 13(b) and the type in which both programs and data are stored in a CD-ROM and programs are written in a program memory area of a RAM or a flash memory of the central processing unit as shown in FIG. 13(a) while the same version program is used. However, in the latter type whose program(s) has been updated, after the processing of step S23, needless to say, reading and writing of the updated program into program memory are necessary. Although the guidance route is usually memorized with a road number, an intersection number or the like as described previously, position information for a destination, a roundabout point and the like is memorized in the form of coordinate values, therefore the memorized coordinate values can be retained as is for later use without being deleted in step S25. The same is true for other information which can be used as is, including search conditions such as express road priority, toll road priority, and the like.

Figure 7:
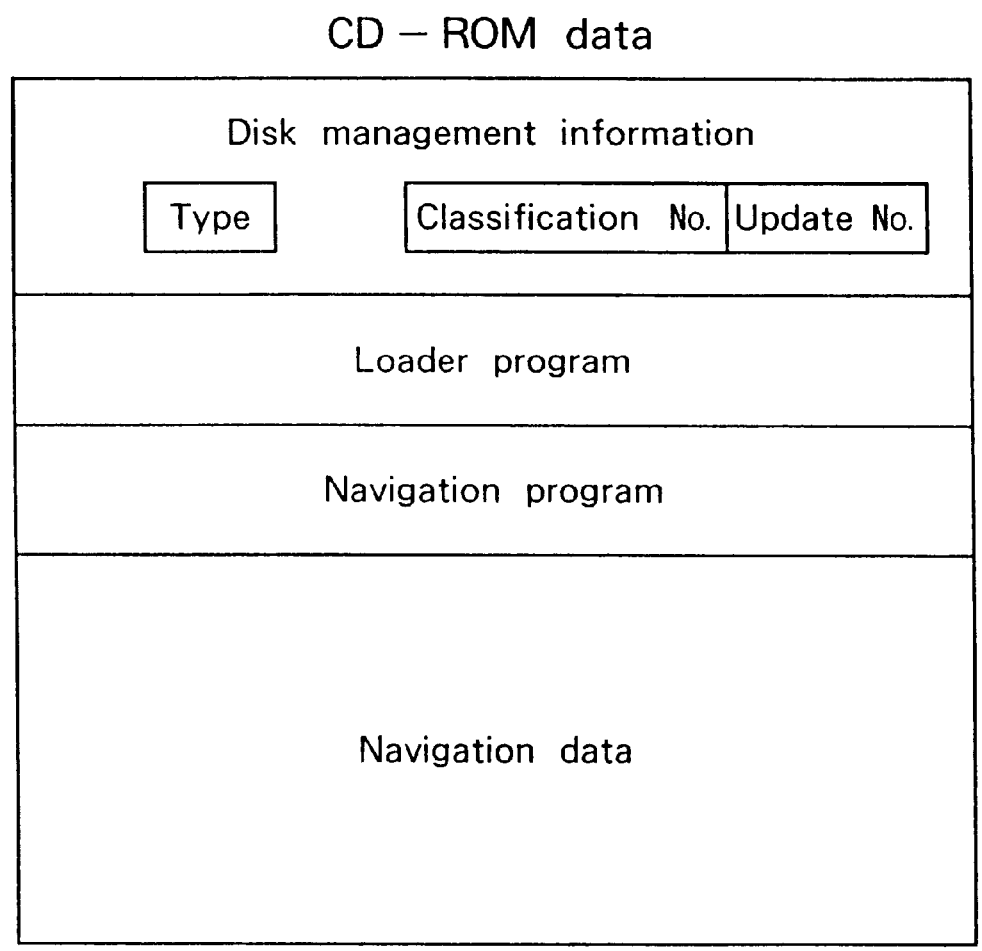
FIG. 7 is a chart illustrating arrangement of data stored on a CD-ROM.

The CD-ROM data comprises, as shown in FIG. 7 for example, disk management information, loader programs, and data for navigation. The disk management information includes identification of CD-ROM type (either navigation, music, video, or the like), classification Nos. of local version, nation-wide version, sightseeing version, leisure version, genre, and the like, update No. and the like. In the case of a navigation program, if it is a local version, by providing an appropriate area with coordinates, it is possible to identify an area on the basis of the coordinates. As explained previously, the overall navigation program includes a map drawing program, a route search program, a route guidance program, a current position calculation program, a destination setting operation control program and the like, and is divided into an application section and an OS section. Data includes map data, search data, guidance data, map matching data, destination data and the like.

In the CD-ROM shown in FIG. 8, its address space is allocated such that an index is stored beginning at address d, program A is stored beginning at address a, program B is stored beginning at address b and data (A) is stored beginning at address c. The index information comprises data address, data size, program number (n) and program address information of each type. The program address information of each type includes corresponding type (e.g., A, B, . . . ), version, program address, and program size. This index corresponds to disk management information shown in FIG. 7 and the corresponding type corresponds to the classification number. Thus, program A is a program of the corresponding type A which is read into the central processing unit and activated therein and program B is a program of the corresponding type B which is read into the central processing unit and activated therein. Both the programs can utilize data (A) of the type A. Namely, for data (A), the program B which can be activated in the type B such that navigation program using data (A) produced for the type A can be serviced for the type (B). Thus, if corresponding to this type A CD-ROM, the loader program in the central processing unit (ECU) is equipped with a function capable of reading the index and recognizing the address and size of the program A, if the index is read as shown in FIG. 8(a), next the program A is read and stored in the program memory (second RAM in FIG. 1), so that route search and route guidance can be executed utilizing data (A) of the type A. Likewise, if the CD-ROM is of the type B and if the loader program in the central processing unit is equipped with a function capable of reading the index and recognize the address and size of the program B, if the index is read as shown in FIG. 8(b), next the program B is read and stored in the program memory (first RAM 42 in FIG. 1), so that route search and route guidance can be performed with the data (A) of the type A by activation of the program B of the type B. Thus, both types of the CD-ROM can be commonly used. For example, by using a CD-ROM containing the program A, the program B and data (B) of the type B in the type A central processing unit, it is possible to execute route searching and route guidance with data (B) of the type B by first activating program A of the type A.

Figure 9:
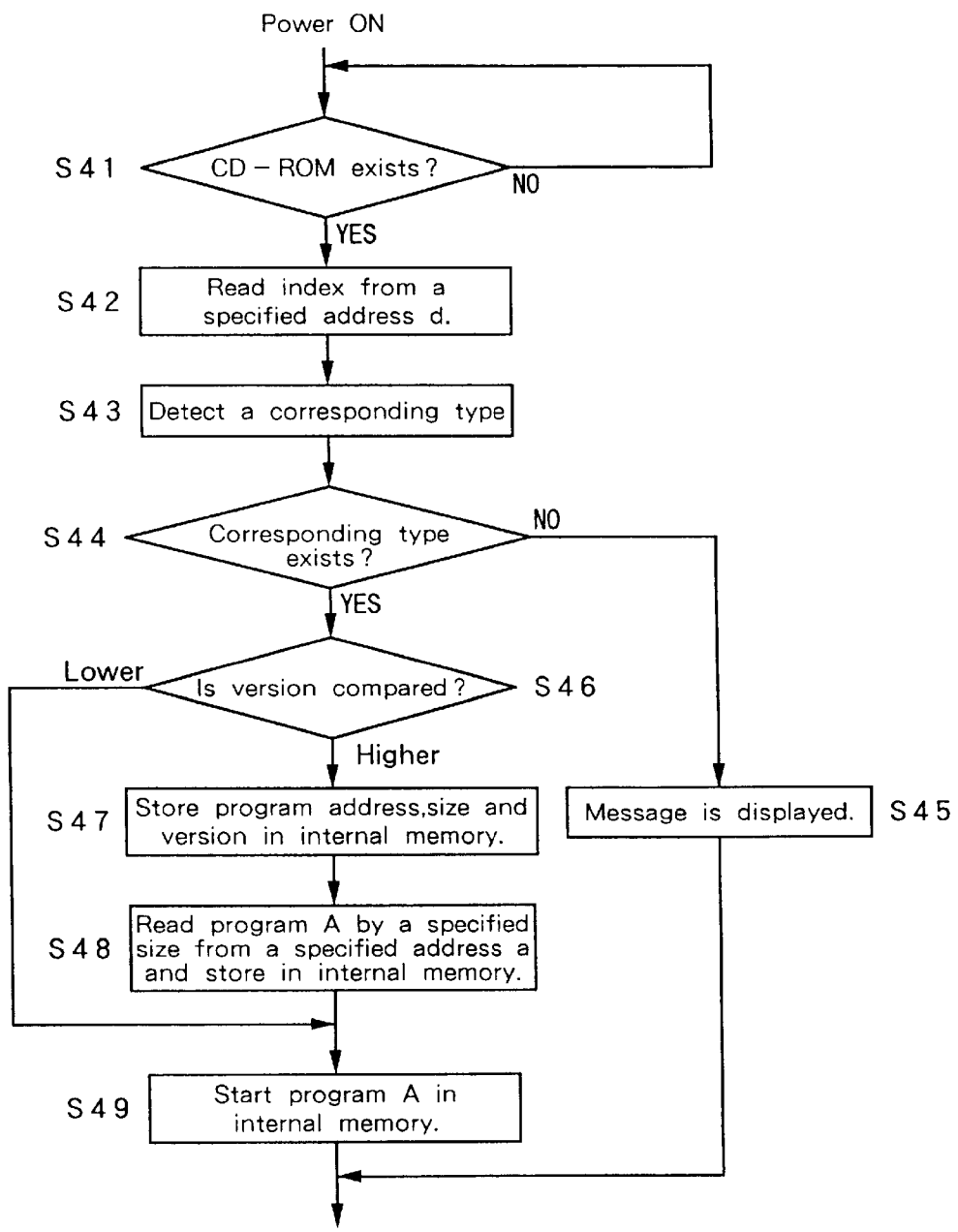
FIG. 9 is a flow chart of the loader program.

In execution of the loader program, as shown in FIG. 9, first, presence of CD-ROM is determined (step S41) and if a CD-ROM has been loaded, the index is read from its specified address d (step S42). Then, compatibility is determined according to program address information for the type (step S43). Then, whether or not the CD-ROM is a compatible (corresponding) type (e.g., A) is judged (step S44) and because this CD-ROM cannot be used if not a corresponding type, an appropriate message indicating incompatibility is output and displayed (step S45). If of a corresponding type, its program version is compared with that in the program memory (step S46). Then, if the version is the same or of lower level, the program A in the program memory is started immediately (step S49). If the version is of a higher level, the address, size and version of the program are stored in the program memory (step S47). The program A is then read as a specified size from a specified address a and stored in the program memory (step S48). After that, the program A in the program memory is started (step S49). In this manner, if the version is the same or of lower level, processing wasteful in step S47 and step S48 can be omitted so that a quick start of the program can be realized.

Figure 10A:
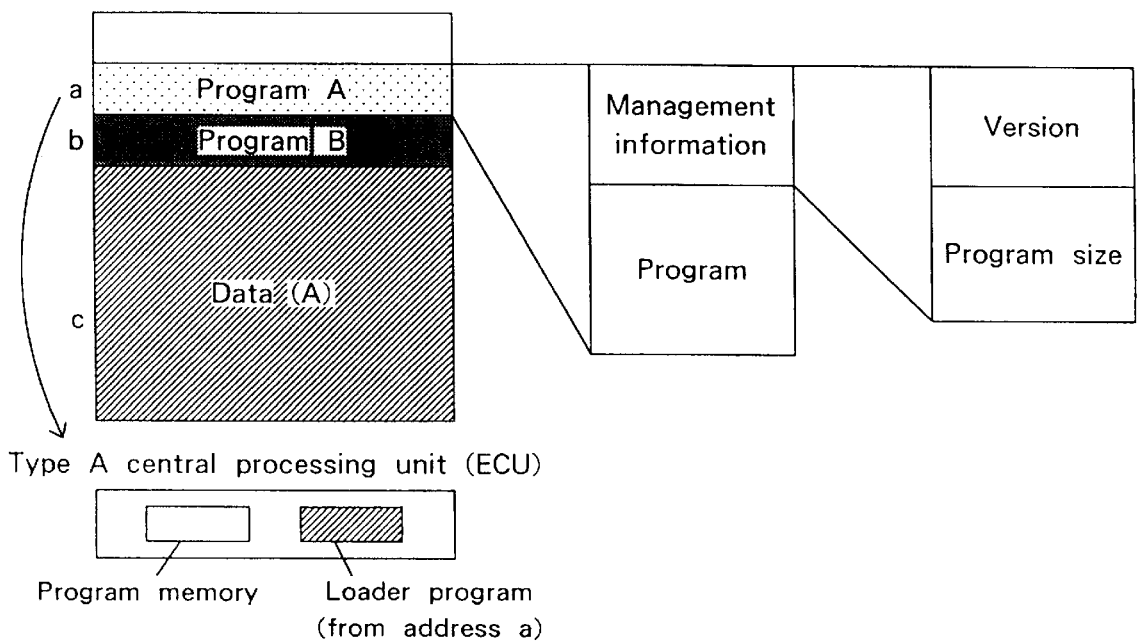
FIGS. 10a and 10b illustrate relationship between the contents of the CD-ROM and the loader program prepared in the central processing unit.
Figure 10B:
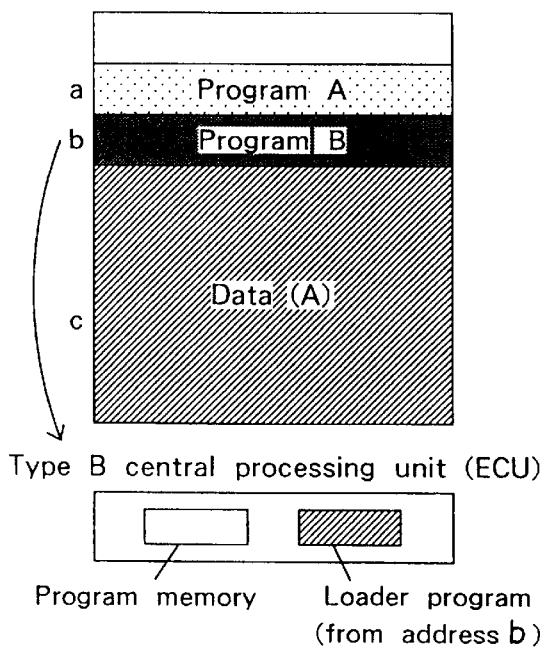

FIG. 10 is an example of construction of a CD-ROM lacking a stored index. Version and program size for both the program A and the program B are stored as management information. Corresponding to such a CD-ROM, program reading addresses are set in the loader program of the central processing unit. For example, in the loader program of the central processing unit of the type A, the program A is read from the address as shown in FIG. 10(a). First, management information is read and stored in the program memory. Subsequently, according to the program size specified in the management information, a program is read and stored in the program memory. By activating the program A, navigation using data (A) of the type A is conducted. On the other hand, the loader program of the central processing unit of the type B functions to read the program B from the address b as shown in FIG. 10(b). First, management information is read and stored in the program memory. Subsequently, according to the program size identified by the management information, the program is read and stored in the program memory. By activating this program B, navigation using data (A) of the type A is conducted. Even in this construction, by comparing the version as identified in the management information with that in the program memory, whether or not the program should be updated may be determined.

Figure 11A:
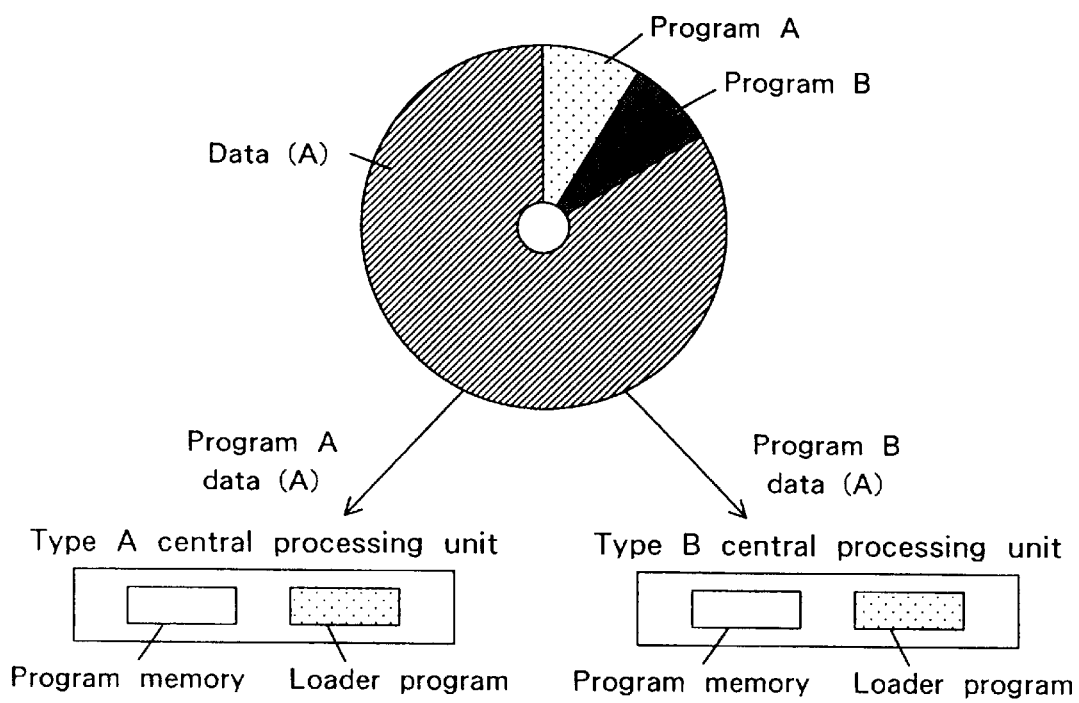
FIGS. 11a and 11b are diagrams illustrating utilization of the CD-ROM by the central processing unit.
Figure 11B:
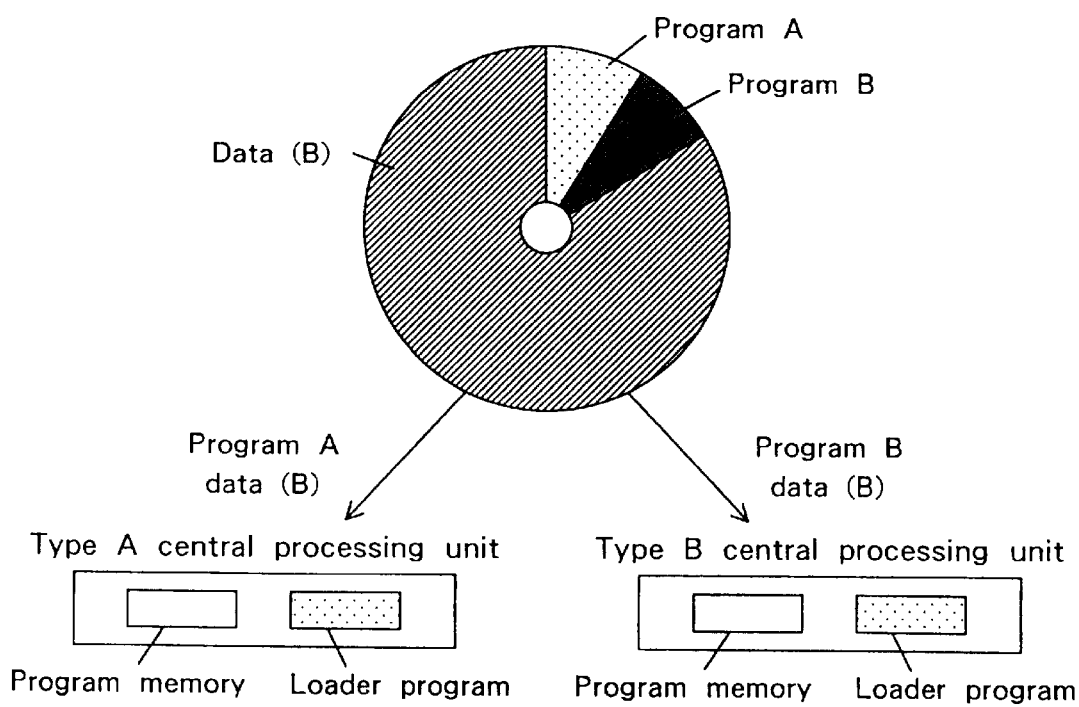

FIGS. 11(a) and 11(b) illustrate utilization of the CD-ROM by the central processing unit of the type A and that of the type B, respectively. FIG. 11(a) shows a case in which data (A) of the type A is memorized and a CD-ROM storing the program A for use in the central processing unit of the type A and the program B for use in the central processing unit of the type B is used. FIG. 11(b) shows the case in which data (B) of the type B is memorized and a CD-ROM storing the program A for use in the central processing unit of the type A and the program B for use in the central processing unit of the type B is used. In the central processing unit, a loader program and a program memory which read the program of its type from the CD-ROM are stored. The CD-ROM contains the programs A and B of respective types A and B, each comprising an application section including a map drawing program, route search program, route guidance program, a current position calculation program, and a destination setting operation control program and an OS section. The CD-ROM also stores all data necessary for operation of the navigation system, including files of map data, search data, guidance data, map matching data, destination data and the like, commonly used by each of the stored programs. As a result, it is possible to use a CD-ROM of any type so that the utilization and flexibility of the navigation system are enhanced.

The present invention is not restricted to the above described embodiments and can be modified in various forms. For example, although in the above embodiment route search processing at the time of a disk change is periodically conducted by interruption, it is permissible to conduct route search processing at the time of a disk change by using a disk mounting/removal signal as a trigger. Although the external information storage device is described as a CD-ROM it is permissible to use a memory card, an optical card or other memory medium if it is a small size information storage medium which can be received and utilized by the system. Although in the present embodiment, programs are prepared corresponding to each type by combining the application section and the OS section in a set, it is permissible to provide a plurality of programs containing a plurality of OS sections highly dependent on hardware and a single application section adapted for common use.

Further, with regard to the arrangement of the application and OS sections as stored in the CD-ROM, as shown in FIG. 12(a) it is permissible to not only divide the OS section into subsections corresponding to the type A and the type B, but also to divide the OS section into subsections including a common section for both the type A and the type B and specialized separate subsections for the type A and type B, respectively. With the latter arrangement it is possible to reduce the amount of memory occupied. To ensure a correspondence between upper models A and B of a certain type as shown in FIG. 12(b), it is permissible, not only to divide the application section and the OS section, respectively, into sections for the type A and the type B, but also to provide a construction wherein the application section is commonly used between the type A and the type B. Still further, it is permissible to construct the OS section so as to provide a common subsection for both types A and B and their own specialized subsections for each of A and B. Needless to say, such combinations may be appropriately changed as required.

Figure 15:
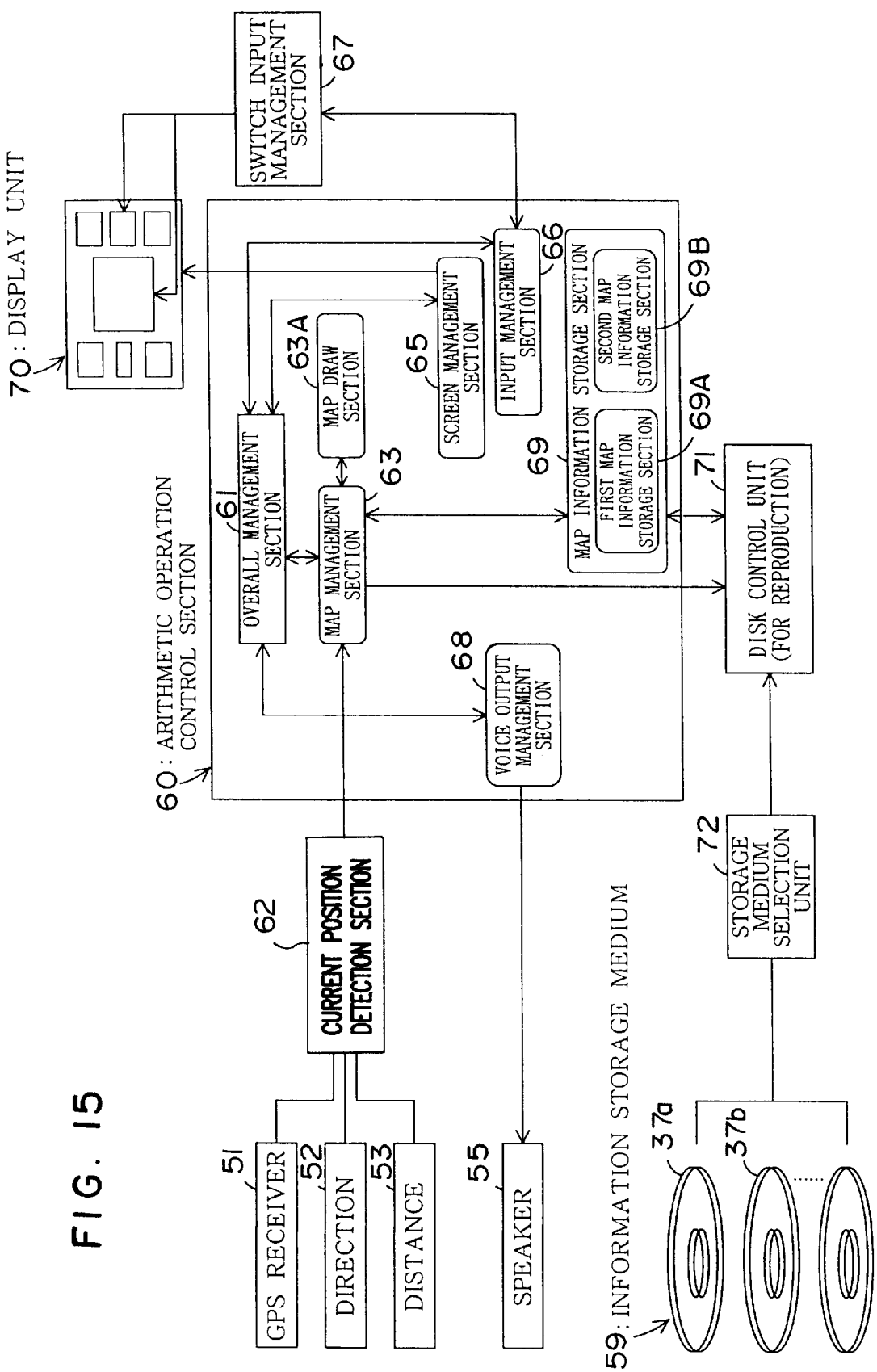
FIG. 15 is a block diagram of a vehicle navigation system according to an embodiment of the present invention.

FIG. 15 shows a preferred embodiment of a navigation system according to the present invention as including an arithmetic operation control section 60. This arithmetic operation control section 60 is connected to a display unit 70, which functions as a touch panel providing operation switches, and a switch control section 67 for controlling input from the touch panel of the display unit 70. The arithmetic operation control section 60 corresponds to the previously mentioned central processing unit 4 and the display unit 70 corresponds to the previously described display 12.

Switches for calling up a menu screen of the navigation system, switches for adjustment of air conditioning, switches for operating audio equipment and other switches may be provided in the display screen(s) of display unit 70. Operation of one of these switches serves to present a corresponding menu screen. The screen displayed on the touch panel has a hierarchical structure so that the menu screen of highest level is first presented.

On a menu screen of the navigation system, for example, keys for destination setting, place name detection and the like are displayed. If a destination setting key is specified, a menu with keys for specifying a ski area, a golf course or the like is displayed as a lower level screen and, by keying in selections from this and subsequent menu screens, the lowest level screen is eventually displayed.

The arithmetic operation control section 60 is connected to a disk control unit 71 for reading an external information recording medium 59 (one of disks 37a, 37b) selected by current position detection section 62 and a recording medium selecting unit 72, and to a disk control unit 71. The current position detection section 62 obtains data from a GPS (global positioning system) receiver 51, a direction sensor 52 and a distance sensor 53 and utilizes this data to determine the current position of the vehicle. The current position detection section 62 corresponds to the previously described current position detecting unit 2. The GPS receiver 51, the direction sensor 52, and the distance sensor 53 correspond to the aforementioned GPS receiver unit 21, the absolute direction sensor 24, the relative direction sensor 25 and the distance sensor 26, respectively. GPS receiver 51 is a unit for receiving signals from an artificial satellite and for obtaining various information such as signal transmission time, position information for the receiver, receiver moving speed and receiver moving direction.

Additionally, although not shown, current position detection section 62 is provided with a beacon receiver which is a unit for receiving a signal transmitted from a transmitter installed at a particular point and can obtain specific VICS information, namely information about vehicle travel such as traffic jam information, current position information and parking information.

Direction sensor 52 includes both an absolute direction sensor and a relative direction sensor. The absolute direction sensor is a geomagnetic sensor for detecting the direction which the vehicle is facing by magnetic detection of N direction.

The relative direction sensor is a sensor for detecting whether or not the vehicle has turned at an intersection and may be an optical rotation sensor installed to detect rotation of the steering wheel, a revolution type resistance sensor or an angle sensor installed on the wheels. It is possible to use a gyro sensor for detecting a change in angle from angular velocity. That is, any means capable of detecting a change in angle relative to a standard angle (absolute direction) may achieve this purpose.

Distance sensor 53 may be a sensor which detects and counts the rotations of a wheel or a sensor which detects the acceleration and integrates it twice. That is, it may be any means capable of measuring travel distance of the vehicle.

As output for voice guidance from the navigation system, the vehicle is equipped with a speaker 55.

External information storage medium 59 contains map data, intersection data, node data, road data, photo data, registration point data, guidance point data, destination data, telephone number data, address data and the like, necessary for route guidance, i.e. serves as a data base containing all data necessary for operation of the navigation system. The external information storage medium 59 corresponds to the aforementioned information storage section 3, and map data, intersection data, node data, road data, photo data, registration point data, guidance point data, destination data, telephone number data, address data and the like of the external information storage medium 59 correspond to the data stored in the information storage section 3 of the previously described embodiment.

The external information storage media 59 include various types, for example, a nation-wide version CD-ROM 37*a* with nationwide map data, a local version CD-ROM 37*b*, with more detailed map data than the nation-wide version and covering only a part of the geographical area of the former, and a sightseeing CD-ROM with sightseeing information.

The disk control unit 71 is connected to the recording medium selecting unit 72 and instructs the recording medium selecting unit 72 as to the external information recording medium 59 to be selected, either in correspondence to the current position of the vehicle or responsive to external input. Then, map information for the vicinity of the current position and information for route guidance are read from the selected external information recording medium 59.

The arithmetic operation control section 60 comprises a CPU (central processing unit), ROM (read only memory), RAM (random access memory) and the like and the CPU executes the programs stored in the ROM, using the RAM as a working area to achieve the above mentioned operations.

The arithmetic operation control section 60 comprises a map information storage section 69, a map drawing section 63A, a map management section 63, a screen management section 65, an input management section 66, voice output management section 68 and an overall management section 61 for managing each of the other sections. Then, the arithmetic operation control section 60 conducts a route search to determine a route from the current position to the destination by managing operation of each of its component sections, as in conventional navigation systems, and provides route guidance to the destination by voice and display.

The map management section 63 manages the map information storage section 69 and the map drawing section 63A so as to provide map information corresponding to the current position from the current position measuring section 62 and to provide route information. The map management section 63 is connected to the disk control unit 71.

The map information storage section 69 is connected to the disk control unit 71 and includes a first map information storage section 69A and a second map information section 69B. The respective storage sections memorize map information corresponding to the current position and route information for the determined route to the destination. Information stored in the first map information storage section 69A is managed by the map management section 63 which, although shown as a single RAM, may be a plurality of RAMS.

The map drawing section 63A is designed to draw various pictures such as maps, roads, buildings, guidance symbols and the like.

The screen management section 65 is connected to the display unit 70 and manages the map drawing section 63A so to output drawn picture data to the display unit 70.

The input management section 66 is connected to the switch input management section 67 so as to manage input data.

The voice output management section 68 outputs route guidance by voice during travel to the destination under control of the overall management section 61.

Operation of the foregoing embodiment will now be described.

First, the overall management section 61 of the arithmetic operation control section 60 surveys possible routes between the current position and a destination input from the switch input management section 67. This route search utilizes information from the external information storage medium 59 as in a conventional navigation system. The detected route information and map information corresponding to the current position are stored in the first map information storage section 69A provided in the map information storage section 69.

Then, when the vehicle is started in motion, based on information stored in the map information storage section 69, a map (reduced to a specified scale) for the vicinity around the current position detected by the current position measuring section 62 is displayed on the display unit 70 under control of the screen management section 65.

A map with the determined travel route traced thereon is displayed in the display unit 70 and is scrolled with travel of the vehicle so that vehicle position remains located in the center of the screen. Further, the indication of direction of travel on the display of unit 70 is an upward heading and, with a change in travel direction of the vehicle, the map or the like displayed on the screen rotates so that the travel direction of the vehicle is always displayed as upward.

Next, when route information and map information are output to the display unit 70 based on data received from the first map information storage section 69A, information from a second external information storage medium different from information of the external information storage medium first used in the first map information storage section 69A may be required. For example, if the external information storage medium is changed for example, from a nation-wide version CD-ROM 37a to a local version CD-ROM 37b or from a sightseeing version CD-ROM to a local version CD-ROM, or the like, route information and map information for that portion of the determined route ahead of the current location of a vehicle, contained in the first medium, are preliminarily memorized in the first map information storage section 69A. After such information is memorized in the first map information storage section 69A, reading from the first medium is stopped and the second medium is selected by the recording medium selecting unit 72 and read by the disk control unit 71.

Then, based on the current location as detected by the current position detection section 62 and destination information memorized by the first map information storage section 69A, the detected route information and map information are memorized in the second map information storage section 69B. Responsive to a request for switching the display by an external input, the map information storage section 69 changes from the first map information storage section 69A to the second map information storage section 69B. As when information of the first map information storage section 69A is input to the display unit 70, depending on information memorized in the second map information storage section 69B, a map reduced to a specified scale for the vicinity around the current position of the vehicle is displayed on the display unit 70 under the management of the screen management section 65.

Figure 16:
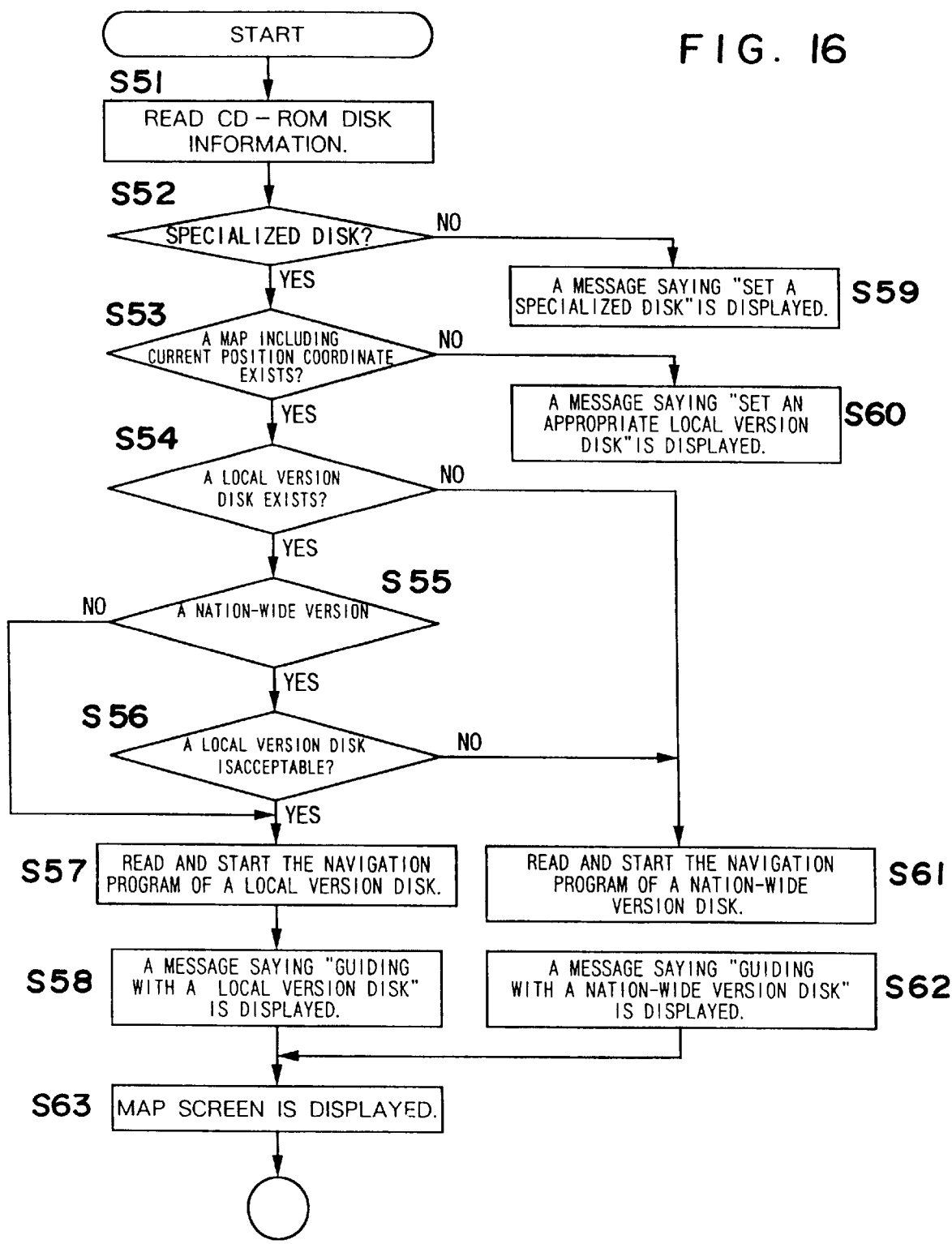
FIG. 16 is a flow chart (1) of a program loading routine utilized in an embodiment of the vehicle navigation system of the present invention.

A program loading routine which is basic to operation of this vehicle navigation system is illustrated in FIG. 16, wherein:

(1) First, the disks contained in the CD changer are identified (step S51). That is, the CD changer is checked for presence of the nation-wide version CD-ROM 37a, the local version CD-ROM 37b, other music CD, or game-related CD and the like used for operation of the navigation system.

(2) Next, whether or not a navigation type disk ("specialized disk") is contained in the changer is determined (step S52). Namely, it is determined whether or not either the nation-wide version CD-ROM 37a or the local version CD-ROM 37b is available.

(3) If no navigation (map) CD is present in the changer, an alarm message, for example, saying "Insert a map disk" is displayed on the display unit 70 (step S59).

(4) If navigation disks are present in the changer, whether or not there is a map containing the current location coordinates of the vehicle is checked as to all navigation disks loaded therein (step S53).

(5) If there is no map available containing the current location coordinates, an alarm message, for example, saying "Load an appropriate local version disk" is displayed on a display screen of the display unit 70 (step S60).

(6) Whether the map disk containing the current location coordinates of the vehicle is a local version CD-ROM or a nation-wide version CD-ROM is determined (step S54).

(7) If no local version CD-ROM 37b is present in the changer but a nation-wide version CD-ROM 37a is available therein in step S54, a navigation program of the nation-wide version CD-ROM is read into and memorized in the map information storage section 69 (e.g., a flash memory) disposed in the navigation system so as to activate that program (step S61). Next, a message, for example, saying "Guiding by nation-wide version CD-ROM" is displayed (step S62).

(8) If a local version CD-ROM 37b is present in step S54, whether or not a nation-wide version CD-ROM is available as another CD-ROM is checked (step S55). If no nation-wide version CD-ROM 37a exists, a navigation program of the local version CD-ROM is read and memorized in the map information storage section 69 of the navigation system so as to activate the program (step S57). Then, a message, for example, saying "Guidance by Local Version CD-ROM?" or the like is displayed (step S58).

If the nation-wide version CD-ROM 37a is present in the changer, by operation of a local version CD-ROM use confirmation switch, a user may determine whether or not he will use the local version CD-ROM (step S56). If he judges that he will use it, the local version CD-ROM startup processing steps S57 and S58 are executed. If the user refuses to use the local version CD-ROM 37b, the nation-wide version CD-ROM 37a startup processing steps S61 and S62 are executed.

(9) Depending on the type of CD-ROM to be activated, map display processing is carried out to display an appropriate map on a display screen of the display unit 70 (step S63).

In this manner, whether or not a CD-ROM loaded in the CD changer is a navigation ("specialized") disk is judged and, at the same time, whether or not the navigation disk contains map data including the current location coordinates is judged. Further, whether a nation-wide version CD-ROM or a local version CD-ROM 37b is available is judged and if a local version CD-ROM 37b is present in the changer, priority is given to use of the local version CD-ROM 37b.

Figure 17:
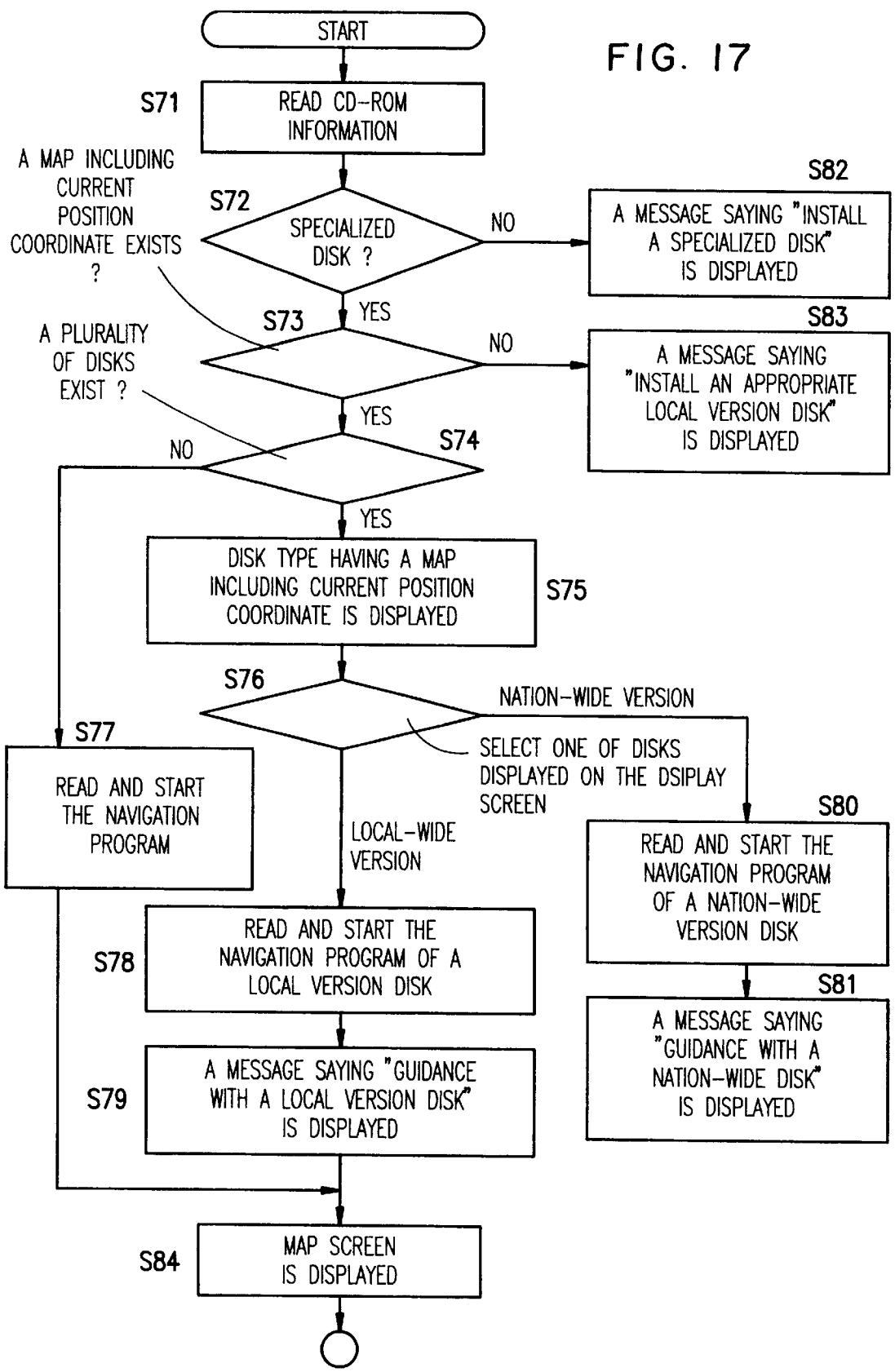
FIG. 17 is a flow chart of a routine for retaining route search information at the time of changeover from a nation-wide version CD-ROM to a local version CD-ROM during travel of the vehicle, according to an embodiment of the present invention.

Next, program loading routine (2) to be used when the vehicle navigation system is equipped with a plurality of CD-ROMs will be described with reference to FIG. 17.

(1) Identification of the disks loaded in the CD changer is checked (step S71). In other words, the changer is checked for the presence of a nation-wide version CD-ROM 37a, a local version CD-ROM 37b, a sightseeing version CD-ROM, a music version CD-ROM, a game version CD-ROM and the like.

(2) Whether or not a navigation ("specialized") disk is loaded in the changer is checked (step S72). Namely, whether or not a nation-wide version CD-ROM, a local version CD-ROM, or a sightseeing version CD-ROM is loaded is checked.

If no specialized disk is loaded, an alarm message, for example, saying "Insert a specialized disk" is displayed on a display screen of the display unit 70 (step S82).

(3) If specialized disks are loaded in the changer, whether or not there is a map containing the current location coordinates of the vehicle is checked as to all of the navigation disks (step S73).

If there is no map including the current location coordinates (e.g., the nation-wide version CD-ROM is not loaded), an alarm message, for example, saying "Load a map disk of a corresponding area" is displayed on a display screen of the display unit 70 (step S83).

(4) Whether there are a plurality of navigation disks containing the current location coordinates is checked (step S74).

If only one navigation disk is loaded in the changer, the navigation program of that CD-ROM is read and memorized in the map information storage section 69 of the navigation system so as to activate that program (step S77).

If there are two or more navigation disks, the types of these disks are displayed on a display screen of the display unit 70 (step S75) so that user can select the disk which he needs (step S76).

(5) From among the types of the disks displayed on the display screen of the display unit 70, one disk is selected, and if the selected CD-ROM is a local version CD-ROM 37b, the navigation program of the local version CD-ROM 37b is read and memorized in the map information storage section 69 of the navigation system so as to activate that program (step S78). Then, a message saying "using local version CD-ROM 7" is displayed (step S79).

If the selected disk is a nation-wide version CD-ROM 37a, the navigation program of the nation-wide CD-ROM 37a is read and memorized in the map information storage section 69 of the navigation system so as to activate that program (step S80). Then, a message saying "Using Nation-wide CD-ROM" is displayed (step S81). If the selected disk is a sightseeing version CD-ROM, as in the case of the nation-wide version CD-ROM 37a and the local version CD-ROM 37b, the navigation program of the sightseeing version CD-ROM is read and memorized in the map information storage section 69 of the navigation system so as to activate that program. Then, a message saying "Guidance by Sightseeing Version Disk" is displayed.

(6) Depending on the type of CD-ROM to be activated, map display processing is performed to display the map on a display screen of the display unit 70 (step S84).

In this manner, whether or not the disk contained in the CD changer is a navigation disk is judged and then, whether that navigation disk has map data including the current location coordinates is judged. If there are two or more disks having the current location coordinates, their disk names are displayed on the display screen of the display unit 70 and the user is invited to select one.

Figure 18:
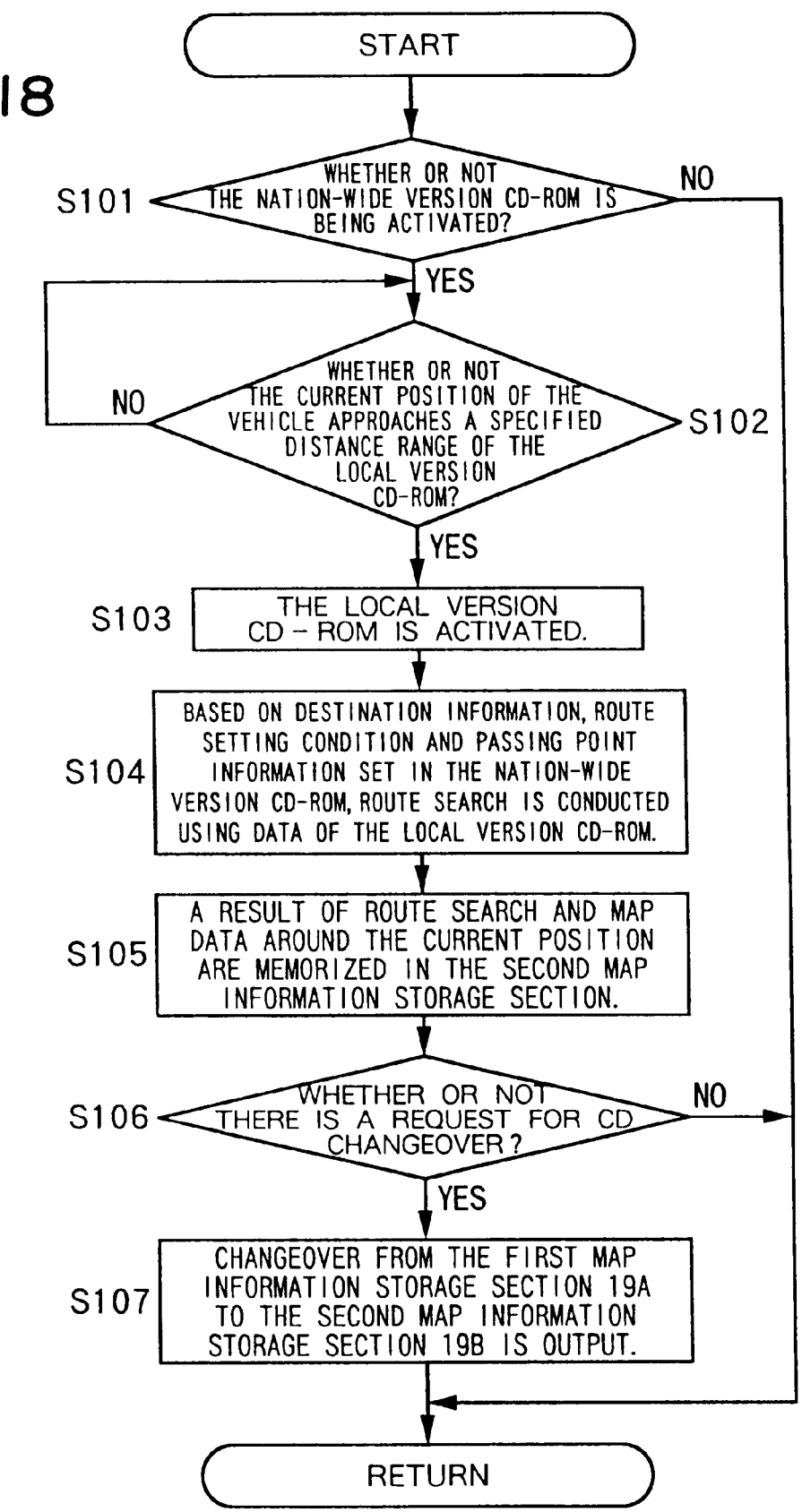
FIG. 18 is a flow chart of a program loading routine utilized in an embodiment of a vehicle navigation system according to the present invention.

Next, a first routine for retention of route search information at the time of automatic switching between the nation-wide CD-ROM and the local version CD-ROM during vehicle travel will be described with reference to FIG. 18.

(1) Whether or not the nation-wide version CD-ROM 37a is being activated is judged (step S101).

(2) If YES is answered in step S101, whether or not the current position of the vehicle has approached or entered the geographical range of the local version CD-ROM 37b is judged (step S102).

(3) If YES is answered in step S102, the local version CD-ROM 37b is activated (step S103).

(4) Next, based on destination information, route setting conditions and passing point information in the nation-wide version CD-ROM 37a, a route search is conducted using data of the local version CD-ROM 37b (step S104).

(5) Then, the result of the route search and map data for the vicinity of the current position are memorized in the second map information storage section 69B (step S105).

(6) Next, whether or not there is a request for CD changeover is checked (step S106).

(7) If YES is answered in step S106, changeover from the first map information storage section 69A to the second map information storage section 69B is output (step S107).

(8) If NO is answered in step S106, there is no changeover from the first map information storage section 69A to the second map information storage section 69B and the routine returns.

Figure 19:
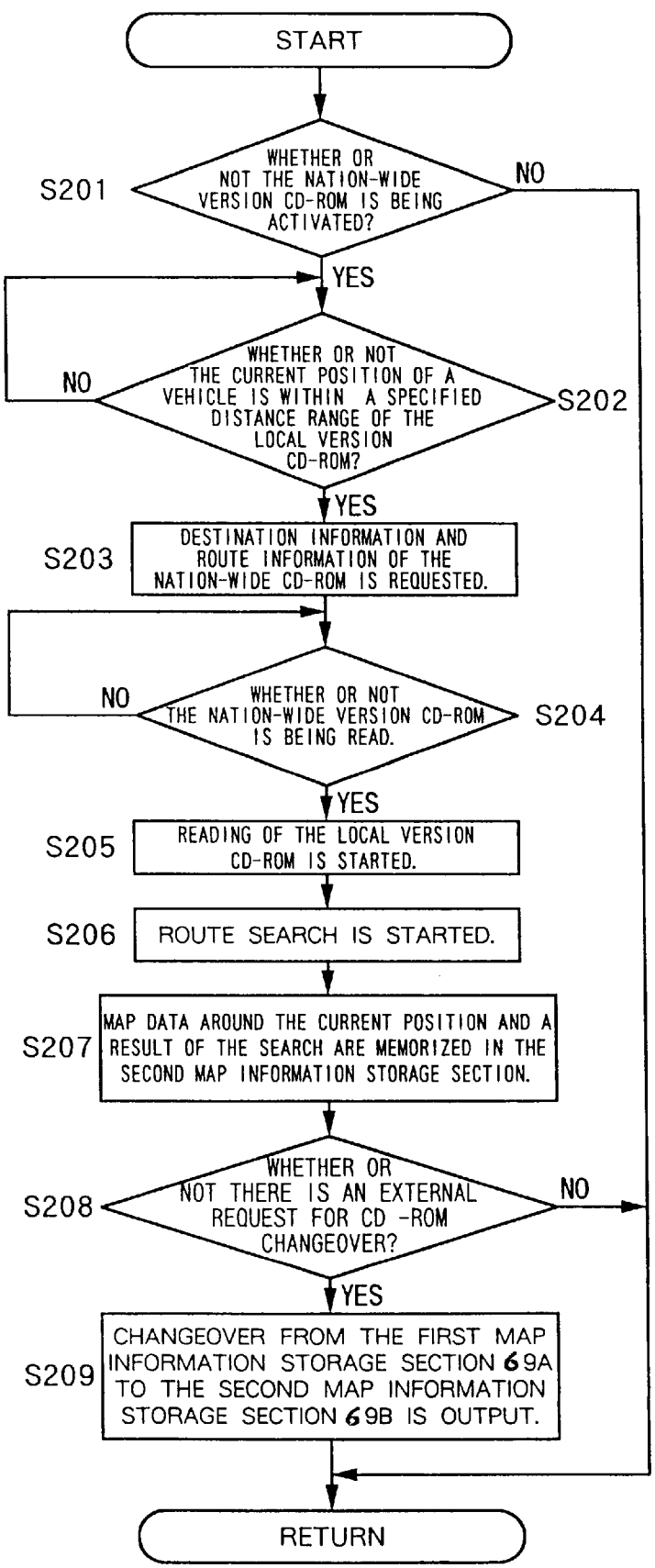
FIG. 19 is a flow chart of a routine for retaining route search information at the time of automatic changeover from a nation-wide version CD-ROM to a local version CD-ROM during travel of the vehicle, according to an embodiment of the present invention.

A second routine for retention of route search information at the time of automatic changeover from a nation-wide version CD-ROM to a local version CD-ROM during travel of the vehicle will now be described with reference to FIG. 19.

(1) Whether or not a nation-wide version CD-ROM 37a is activated is judged (step S201).

(2) If YES is answered in step S201, whether or not the current position of a vehicle is within a specified distance range for the local version CD-ROM 37b is judged (step S202).

(3) If YES is answered in step S202, destination information and route information of the nation-wide CD-ROM 37a is requested (step S203). Then, the destination information and the route information are memorized in the first map information storage section 69A.

(4) Next, whether or not the nation-wide version CD-ROM 37a is being read is checked (step S204).

(5) If YES is answered in step S204, reading of the local version CD-ROM 37b is started (step S205).

(6) Next, a route search is started (step S206).

(7) Map data for the vicinity around the current position and the results of the route search are memorized in the second map information storage section 69B (step S207).

(8) Next, whether or not there is an external request for CD-ROM changeover is checked (step S208).

(9) If YES is answered in step S208, changeover from the first map information storage section 69A to the second map information storage section 69B is output (step S209).

Figure 20:
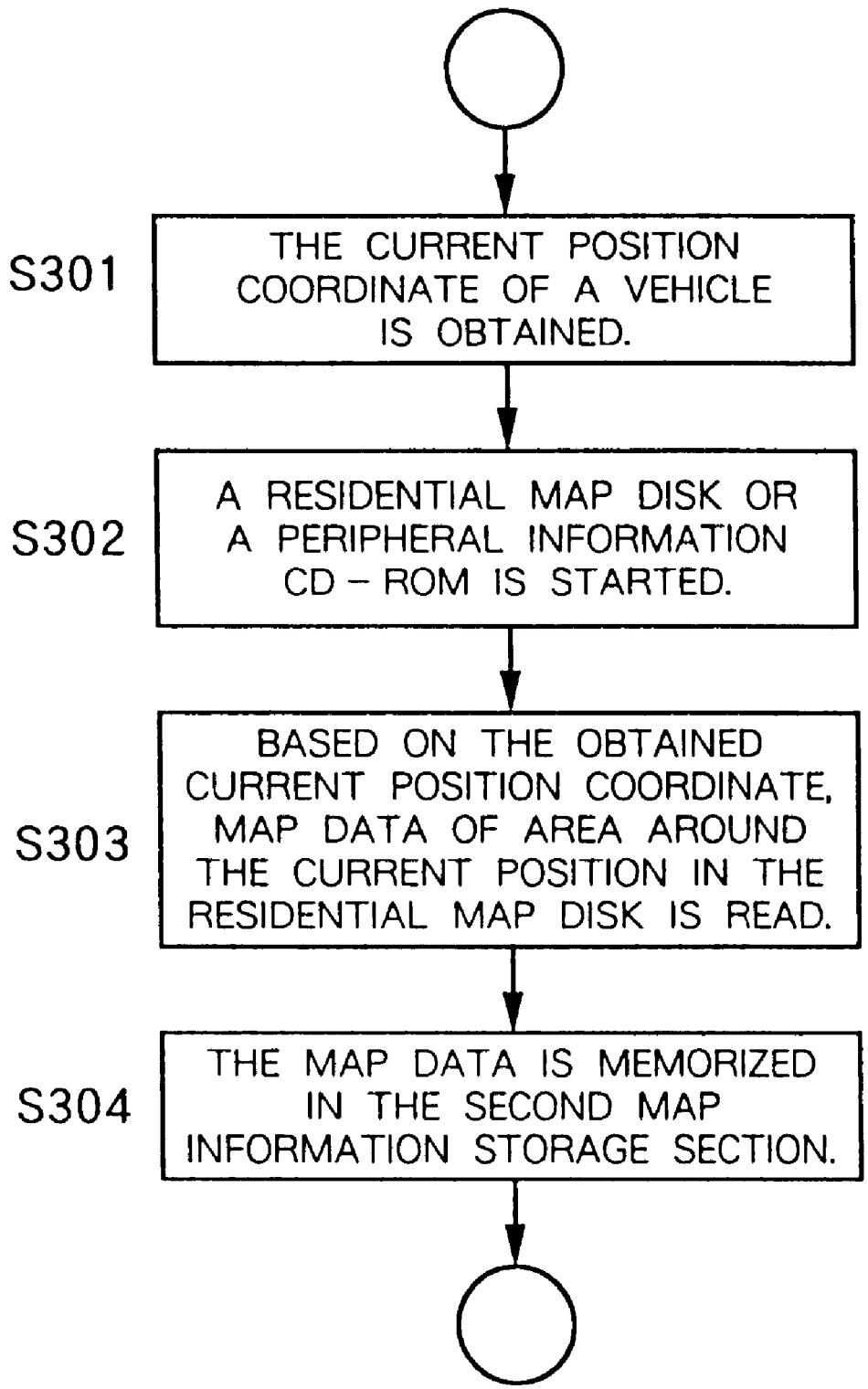
FIG. 20 is a flow chart of a routine for changeover to a residential map according to an embodiment of the present invention.

(10) If NO is answered in step S208, changeover from the first map information storage section 69A to the second map information storage section 69B is not output and the routine returns. During travel of the vehicle with guidance by a display based on the nation-wide version CD-ROM or the local version CD-ROM, a quite detailed map such as a residential map is sometimes requested. FIG. 20 shows a routine for changeover to a residential map disk having detailed map information responsive to such a request.

(1) First, the current position coordinates of the vehicle are obtained (step S301).

(2) Next, a residential map disk or a peripheral information CD-ROM is started (step S302).

(3) Then, based on the obtained current position coordinates, map data for the area around the current position in the residential map disk is read (step S303).

(4) Then, that map data is memorized in the second map information storage section 69B (step S304). Such processing is automatically conducted when the vehicle enters an area for which a residential map disk is available.

Figure 21:
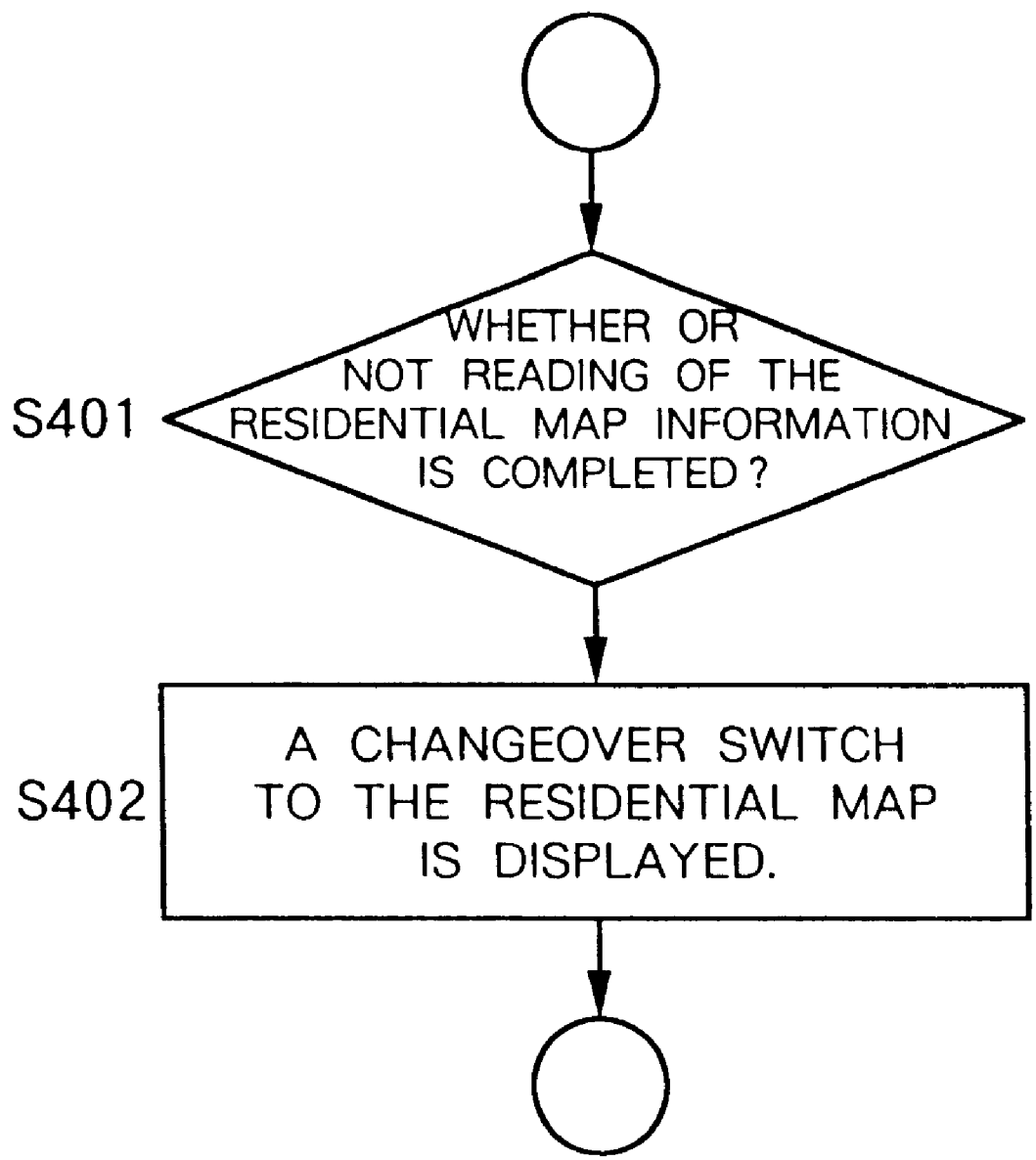
FIG. 21 is a flow chart of a routine for a residential map display according to an embodiment of the present invention.

A routine for residential map display will now be described with reference to FIG. 21.

(1) If in the routine shown in FIG. 20, map data is memorized in the second map information storage section 69B (step S304), a check is made to determine completion of residential map information (step S401).

Figure 22:
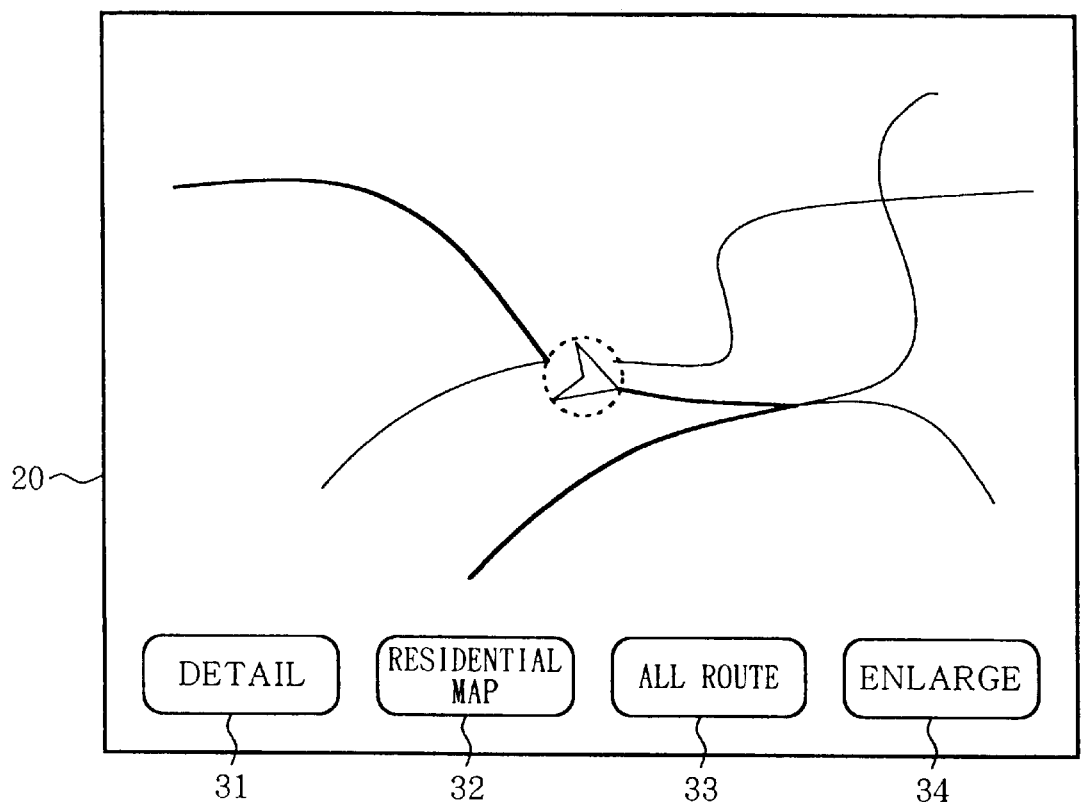
FIG. 22 is a diagram showing a display changeover screen (No. 1), for changing to a residential map etc., according to an embodiment of the present invention.

(2) To notify the user the residential map data can be displayed on the screen, if YES is answered in the above-mentioned step S401, a switch for changeover to the residential map is displayed (step S402). For example, in this case, as shown in FIG. 22, a detail key 31, a residential map key 32, an all route key 33, and an enlarge key 34 are displayed on the display screen of the display unit 70. Here, any one of the detail key 31, the residential map key 32, the all route key 33 and the enlarge key 34 can be selected. If the residential map key 32 is selected, map information and route information based on the residential map disk memorized in the second map information storage section 69B is output and displayed.

Figure 23:
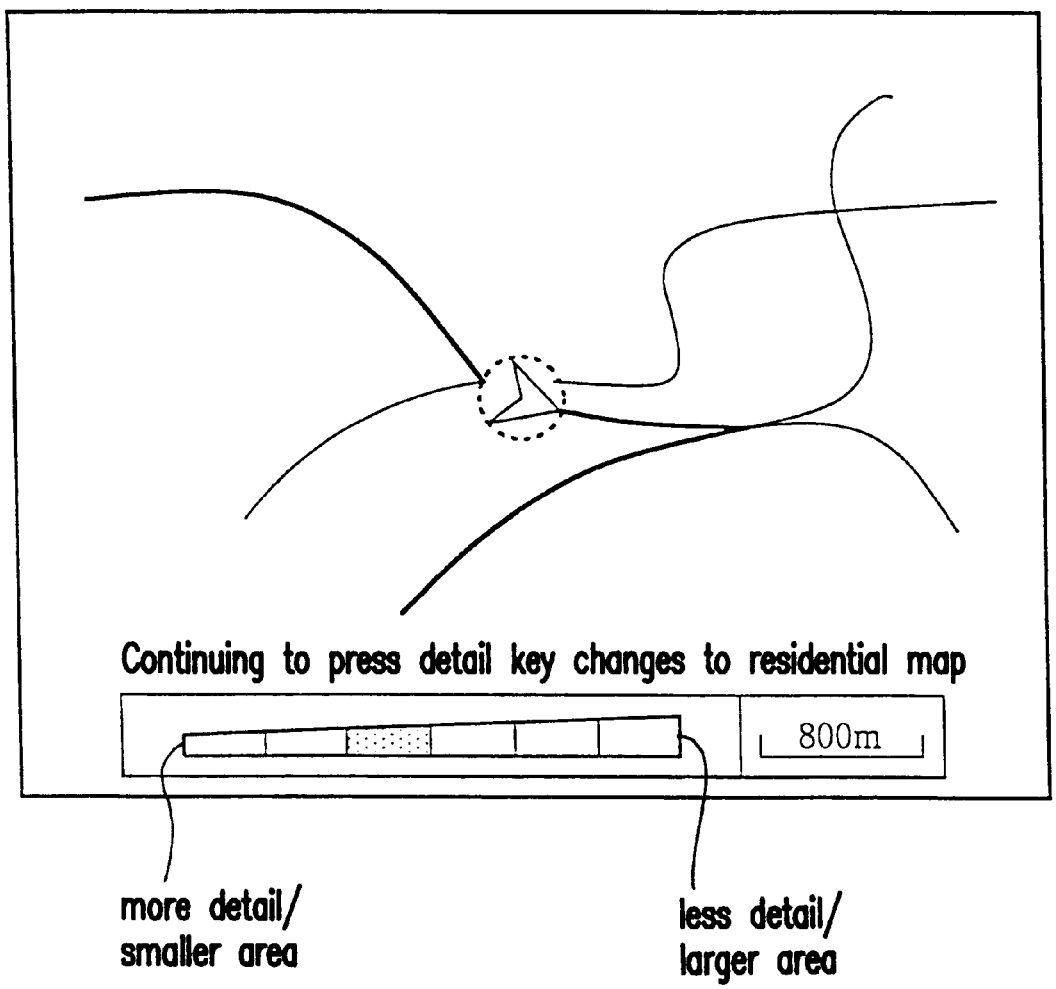
FIG. 23 is a diagram showing another display changeover screen (No. 2), for changing to a residential map etc., according to an embodiment of the present invention.

If the detail key 31 is continued to be pressed, as shown in FIG. 23, a screen including a scale bar is displayed. It is also possible to design the system so that display map information and route information based on the residential map disk is displayed if depression of the detail key 31 is further continued.

Further, it is possible to display the display screen shown in FIG. 23 when the changeover switch for the residential map is displayed (step S402).

According to another embodiment of the present invention, the navigation system searches to determine a route to an input destination and provides route guidance. In this embodiment the navigation system includes: a plurality of map information storage means (CD-ROM 37a–37e) at least one of which contains map information (road map data or residential map data) for conducting route guidance following the determined route; range information extracting means (step SB5) for extracting the geographical coordinate range (coordinate range ZP) of the aforementioned map information from each of the plurality of the map information storage means; a current position detecting means (current position detecting unit 2, step SA2) for detecting the current position coordinates (current position data MP, guidance start point data SP) of the vehicle; map information selecting means(steps SB6, SB7, SB8, SB39, SB41, SB44, SB61) for selecting a map information storage means, for which the current position coordinates detected by the current position detecting means are contained in a geographical coordinate range extracted from the range information extracting means, from among the plurality of the map information storage means; and a read/display means (display 12, step SB13) for reading the map information from the aforementioned map information storage means selected by the map information selecting means and for displaying it.

According to another embodiment of the present invention, the navigation system, as in the previous embodiment, searches map data to determine a route to an input destination and provides route guidance for following the determined route. The navigation system of this latter embodiment includes: a plurality of map information storage means (CD-ROMs 37a–37e), at least one of which contains map information (road map data or residential map data), for providing guidance along the determined route; category (field) information extracting means for extracting the category of the aforementioned map information from each of the plurality of the map information storage means; destination category detecting means (step SA4, step SB51) for detecting the aforementioned input category, purpose or genre of the destination; map information selecting means (step SB54) for selecting a map information storage means in which the category, purpose or genre corresponds to the category, purpose or genre extracted by the category information extracting means; and reading/display means (step SB13, display 12) for reading and displaying the aforementioned map information from the map information storage means selected by the map information selecting means.

FIG. 24 shows the types of information which may be recorded on the CD-ROMs 37a–37e. In each of the CR-ROMs 37a–37e, a map data file 40a, an intersection ("crossing") data file 40b, a node data file 40c, a road data file 40d, a photo data file 40e, a destination data file 40f, a guidance point data file 40g, a detailed destination data file 40h, a destination reading data file 40I, a navigation program 40j, other data file 40k and a coordinate range 40m are contained. The map data file 40a is divided into two kinds of map data, i.e. road map data and residential map data.

Figure 25:
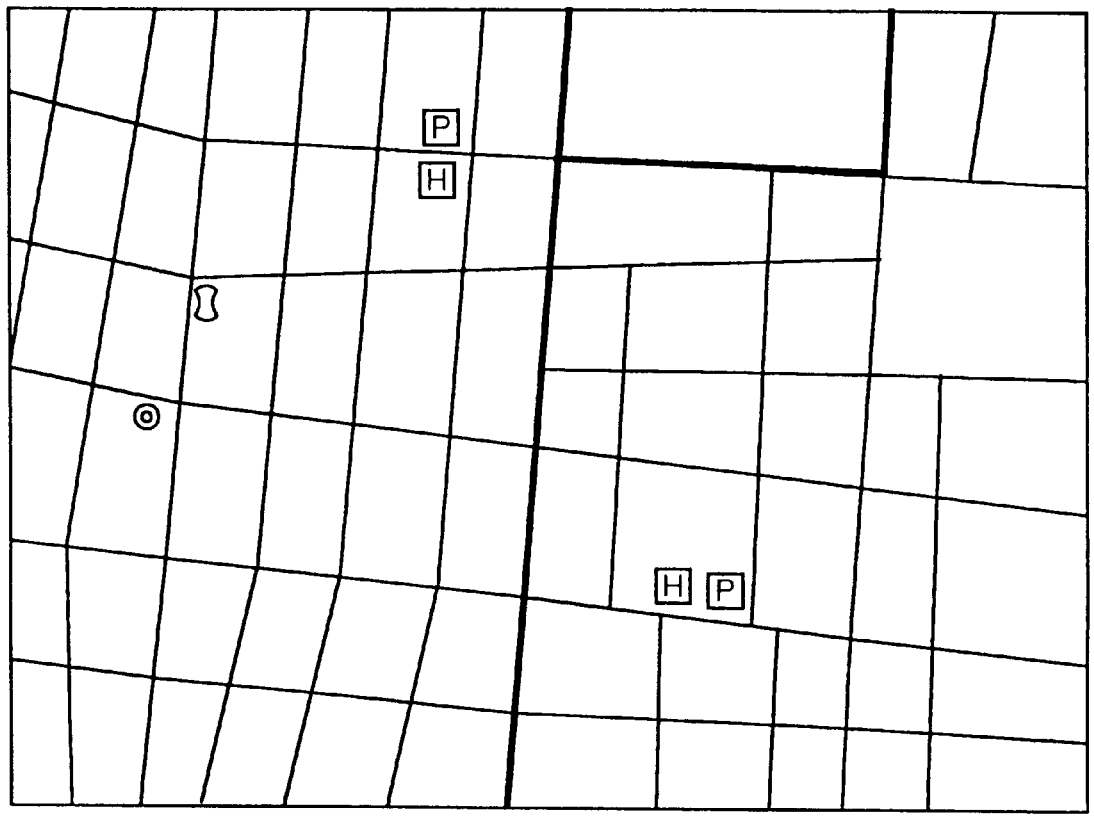
FIG. 25 is a diagram showing an example of the representation of road map data at the lowest reduced scale.

FIG. 25 shows a map enlarged to maximum scale, displayed on the display 12 on the basis of road map data. This road map data includes map data covering nation-wide roads and map data covering only the roads in a block which is obtained by dividing the whole country into several blocks. The ranges for this road map data differ between the respective CD-ROMs 37. Namely, a certain CD-ROM 37 is a nation-wide version in which data only for major roads is recorded and another CD-ROM 37 is a local version containing data for roads in a single, smaller area (e.g., Kanto area, Chubu area, and the like).

Figure 26:
FIG. 26 is a diagram showing an example of representation of residential map data stored in the CD-ROM 37.

FIG. 26 shows a residential map based on data recorded in the CD-ROM 37, displayed on the display 12. This residential map covers a particular geographical area such as a major city, a local city, a town, village or the like. That is, the road map is a relatively simplified map showing only roads necessary for navigation whereas the residential map is a locally limited map in which houses, buildings, roads, rivers and the like are described to an accurate reduction scale. In this residential map, it is possible to recognize a shape of a building, facility, bridge or the like with coordinates and appearance of shape and the like of a part or all of the buildings, land features and the like displayed on the screen. For example, the shapes of all buildings in a certain section surrounded by roads, a river, pond and the like may be displayed.

The road map data recorded in each of the CD-ROMs may include a plurality of maps of the same area of different scales or may include a single road map of the minimum reduced scale. Likewise, the residential map data may include data for a single reduced scale of the same area or may include a plurality of map data sets, each having different reduced scales. In the display of a road map based on road map data as shown in FIG. 25, roads are identified by lines having a different size and color. For major buildings, facilities and the like, a symbol mark is shown at its center. Although graphic representation of other information is omitted, geographical information such as building and facility names, major road names, geographical names of cities, towns and villages, and traffic restriction marks such as one-way only are displayed.

On the other hand, the residential map is a map of an enlarged scale as compared to the road map of the minimum reduced scale as shown in FIG. 25 or a map of the same reduced scale. In this residential map, the ratio of respective road widths to lengths is the same as the ratios of the actual roads and further sidewalks and footbridges are also displayed. Additionally, the shapes of rivers, buildings, facilities and the like are represented with the same ratio as that of the actual dimensions.

The intersection ("crossing") data file recorded in the CD-ROM 37 is data concerning the name, location and the like of an intersection. Likewise, the node data file is coordinate data for the nodes specified on each road. The road data file includes data for the name and kind of road, number of its lanes, connections between roads and the like. The photo data file is picture data for photographs showing places required to be visually displayed such as various facilities, sightseeing spots, major intersections and the like.

The destination data file is data for locations which may serve as destinations such as the location, name and the like of places and facilities such as major sightseeing spots, buildings, and corporations and factories registered in the yellow pages. The guidance point data file contains guidance data for providing information regarding road-side markers and signs and instructions for travel through an intersection. The detailed destination data file is data providing further details of a destination memorized in the above-mentioned destination data file. The destination reading data file is listed data for retrieving a listed destination memorized in the above destination data.

The house shape data file contains data identifying building shape and identification data for building shapes for indicating the building shape in correspondence with the above-mentioned residential map data. The building shape mentioned here refers to a plan view of a place sectioned in plan view such as an actual building, a facility, a road, a river and the like, or to three-dimensional appearance of a place represented in two dimensions by a perspective view or the like. Although building shape has been referred to for convenience, shape data may be provided for such various facilities, land features, roads, lakes, and the like. The building shape data includes coordinates of each corner of the external shape of the above mentioned building, external information about the horizontal plane shape, three-dimensional shapes and the like of a building and internal information specific to the building. For example, such internal information may include residential address, name, owner's name, telephone number, work type, neighboring road data and the like. This building shape data, the content and display method for the above mentioned residential map data are described in detail in the specifications and drawings of Japanese Patent No. Sho 7-254274, No. Sho 7-258006 and a patent "Navigation System" filed by the same applicant in Oct. 31, 1995, the teachings of which are incorporated herein by reference.

The navigation program stored in each of the CD-ROMs 37 is used for conducting a route search from the current position to a destination based on road map data memorized in an appropriate CD-ROM 37. Further, if the appropriate CD-ROM 37 is a CD-ROM to be used for sightseeing or another designated purpose, the navigation programs also include a program corresponding to that particular purpose also. For example, the sightseeing CD-ROM 37 contains a program for notifying a user of sightseeing information relevant to each region. This navigation program is read from the CD-ROM 37, written into the first RAM 43 and executed by the CPU 40. That is, the first RAM functions as a shadow RAM.

Other data files which may be stored in the CD-ROM 37 include an address data file for retrieving the above-mentioned destination based on its address, a telephone number list file for retrieving the above-mentioned destination from its telephone number, a data file for retrieving the destination based on information registered by a user such as customer name or a person having a business connection, and the like. Further, the coordinate range 80 m is data recording the latitude and the longitude of a road located on the northernmost end, the southernmost end, the easternmost end and the western-most end of the geographical area for each road covered by the above-described road map data. That is, the coordinate range 80 m indicates the geographical coordinate range of road map data to be recorded in each of the CD-ROMs 37a–37e.

FIG. 27 shows part of a data group stored in the first RAM. A program stored in the aforementioned CD-ROM 37 is copied in a program area PL. Current position data MP is data for indicating the current position of a vehicle as detected by the current position detecting unit 20. Absolute direction data ZD is data for indicating the north-south direction and is based on information from the absolute direction sensor 24. Relative directional angle data Dθ is data for the angle formed by the travel direction of the vehicle relative to the absolute direction data ZD, and obtained on basis of information from the relative direction sensor 25.

Travel distance data ML is the distance travelled by the vehicle and is obtained on basis of data from the distance sensor 26. Current position information PI is data concerning the current position and which is input through the beacon receiver unit 22, the data transmitting/receiving unit 27 or the data transmitting/receiving unit 39.

Registered destination data TP is data registered by a user, concerning the destination, such as the coordinate position, name and the like of the destination. Likewise, final guidance point data ED is coordinate data on a map for a position in which the navigation operation is terminated. These data SP and ED are determined in step SA5 of the routine shown in FIG. 29 and described later.

Guidance start point data SP is the coordinates of the node nearest to the current position of the vehicle. The reason why this guidance start point data SP is memorized is that the current position of the vehicle (and current position data MP) may be within a site such as, for example, a golf course or a parking lot, and is not always on a guidance road. Likewise, guidance final point data ED is also the coordinates of a node nearest the registered destination (data TP). The reason why this guidance final point data ED is stored is that the registered destination data TP is not always for a location on a guidance road.

Guidance route data MW memorized in the first RAM 43 is data indicating an optimum route to the destination, i.e. a recommended route obtained by route searching in step SA5. Respective roads in a road map memorized in the CD-ROM 37 have characteristic (identifying) road numbers. This guidance route data MW is a string of the aforementioned roads from the guidance start point identified by data SP to the final guidance point identified by data ED, and obtained in route search processing.

Disk quantity data Ckm is data indicating the quantity of the CD-ROMs stored in the changer 5. Index information IL(CKm) is data indicating the category, purpose or genre to which a CD-ROM 37 stored in the changer 5 belongs. These categories (field, purpose or genre) of information relate to major destinations for navigation and include, for example: public facility genre, optionally including both nation-wide and local versions, i.e. government offices, hospitals, parks, police stations, and post offices; traffic facility genre including railway stations, crossings, airports, harbors, express road interchanges, parking areas, and service areas; cultural facility genre including shrines, temples, historically significant locations, ruins, and castles; amusement facility genre including zoos, botanical gardens, amusement parks, aquariums, karaoke houses, and game centers; sport/leisure facility genre including fishing parks, diving spots, campgrounds, golf courses, and ski areas; lodging facility genre including hot springs and hotels; dietary facility genre including cafes, hamburger stands and restaurants; automobile facility genre including gas stations, and automobile sale/repair shops; and shopping facility genre including banks, cash corners, drug stores, department stores, book shops, music shops and clothes shops. In addition, these categories, purposes and genre mentioned here, i.e. the category, purpose and genre of a CD-ROM 37, include programs and data for simple games, Karaoke music, quizzes, music and movies.

Each of the CD-ROMs 37 contains information for identifying its category, purpose or genre and this identification information is category out from the CD-ROM 37 and memorized as the index information IL (Ckm). Ckm pieces of such index information IL (Ckm) exist corresponding to the respective CD-ROMs 37. In other words, information concerning the category, purpose and genre of the CD-ROM is located at the Ckm position in the changer 5 as index information IL (Ckm).

Coordinate range ZP (Ckm) is a copy of coordinate range 80 m written and stored in the CD-ROM for navigation. This coordinate range ZP (Ckm) is the maximum value and the minimum value of the latitude and longitude of a road map recorded in each of the CD-ROMs. This value ZP serves to clearly give the geographical range covered by the road map in each CD-ROM intended for use in navigation. Ckm pieces of data for this coordinate range ZP exist corresponding to each CD-ROM 37, like the index information FIG. 28 shows information and data to be written into the second RAM 41. An accumulated use frequency LK(OP) is memorized in this second RAM 41. This accumulated use frequency LK(OP) indicates the number of times each CD-ROM has been used in the navigation system. The variable (OP) is a variable identifying the accumulated use frequency LK in terms of category (category, purpose or genre) and indicates the type of the category. For example, OP=1 indicates a category for golf courses and OP=2 indicates a category for sightseeing locations.

Figure 29:
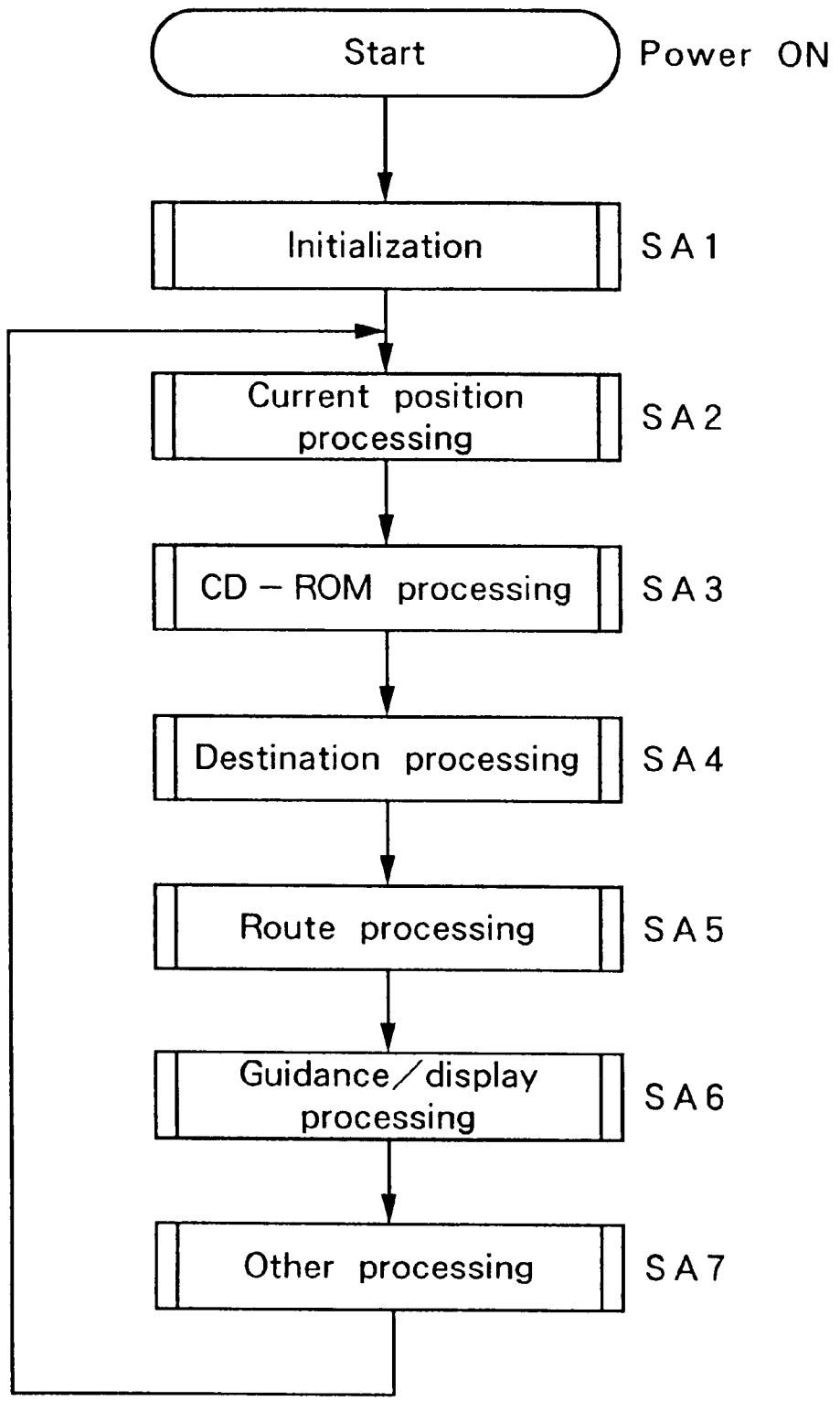
FIG. 29 is a flow chart of a main routine for operation of the entire navigation system.

FIG. 29 is a flow chart of a routine for the overall operation of the navigation system, which routine is executed by the CPU 40. Execution of the routine of FIG. 29 is started by turning on the power and is terminated by turning off the power, i.e. on/off of the power of the navigation system or on/off of the engine start key (ignition switch) of the vehicle. In this routine, first, the CPU 40, the RAM 42, the picture memory 44 and the like are initialized (step SA1). Then, current position processing (obtaining the current position, etc.) (step SA2), CD-ROM 37 processing (content recognition, etc.) (step SA3), destination processing (destination setting, etc.)(step SA4), route processing (route search, etc.) (step SA5), guidance/display processing (step SA6) and other processing (step SA7) are carried out repeatedly.

In the current position processing (step SA2), on the basis of signals received from a plurality of satellites, the coordinate position of each satellite, radio transmission time of the satellite and radio reception time by the GPS receiver unit 21 are identified. Then, according to those pieces of information, a distance to each satellite is calculated and further, according to the distance to each satellite, the coordinate position of the vehicle is calculated and then the current position thereof is obtained. This obtained coordinate position of the vehicle is stored in the first RAM 43 as the current position data MP. This current position data MP may be corrected by information input from the beacon receiver unit 22 or the data receiver unit 23.

On the basis of the absolute direction data, the relative direction data and the traveling distance data, arithmetic operation for specifying the current position of the vehicle is conducted. The current position obtained by this arithmetic operation is compared with the map data in the external data and corrected so that the current position on the map screen is displayed correctly. By this correction, even when the GPS signal cannot be received because the vehicle is traveling in a tunnel or the like, it is possible to accurately obtain the current position of the vehicle.

In the CD-ROM processing (step SA3), the content of the CD-ROM 37 stored in the changer 5 is recognized and a CD-ROM for use in display and processing in the navigation system is automatically selected. This CD-ROM 37 processing is executed when the power is turned on and, after the power is turned on, as described later, is executed only when a new CD-ROM 37 is stored in the changer 38. At other times, this processing is jumped over.

In the destination processing (step SA4), on a road map or a residential map shown on the display 12, a coordinate position is specified by a user or a destination is specified by the user by selecting it from a destination list of each item displayed on the display 12. Once the destination has been specified by the user, the central processing unit 1 memorizes information data for the coordinates or the like of the destination in the first RAM 43 as the registered destination data TP. This information data for the coordinates or the like of the destination includes the building shape data of the residential map, vehicle stops en route to the destination and the like. This destination processing is jumped over if there is no change by the setting of a new destination or a new vehicle stop.

In the route search processing (step SA5), an optimum route from the guidance start point identified by data SP to the final guidance point identified by data ED, through any stops, is determined. The terminology "optimum route" as used herein has reference to a route which allows reaching of the destination in the shortest time or by the shortest distance or, if an express road is used, a route which allows reaching of the destination in the shortest time or by the shortest distance using the express road or a route which allows reaching of the destination or a vehicle stop by travel on the widest roads available. The guidance start point identified by data SP is the same as the initial current position identified by data MP or nearest the current position. If the current position of the vehicle deviates from a guidance route, an optimum route from the current position to which the vehicle has deviated to the final guidance point, through any designated vehicle stop, is automatically searched.

In the aforementioned guidance/display processing (step SA6), a guidance route obtained by the route search processing (step SA5) is displayed as a map screen on the display 12 with a bold line of red, blue or other conspicuous color. Guidance information is audibly announced from the speaker 16 and the vehicle and guidance information is displayed in the map screen of the display 12. For pictures indicating the guidance route, road map data around the current position or residential map data around the current position is used. Changeover between the road map data and the residential map data is determined by the distance remaining to a guidance point (destination, vehicle stop, intersection or the like), the velocity of the vehicle, whether the vehicle is outside or inside of a representable area, or switch operation. Further, in the vicinity of a guidance point (destination, vehicle stop location, intersection or the like), an enlarged map of the vicinity of a guidance point is displayed. Instead of a road map, it is permissible to display a simplified guidance route in which only minimum information about the guidance route and destination or the direction to a stopping place and current position and the like is displayed with omission of other geographical information.

Figure 30:
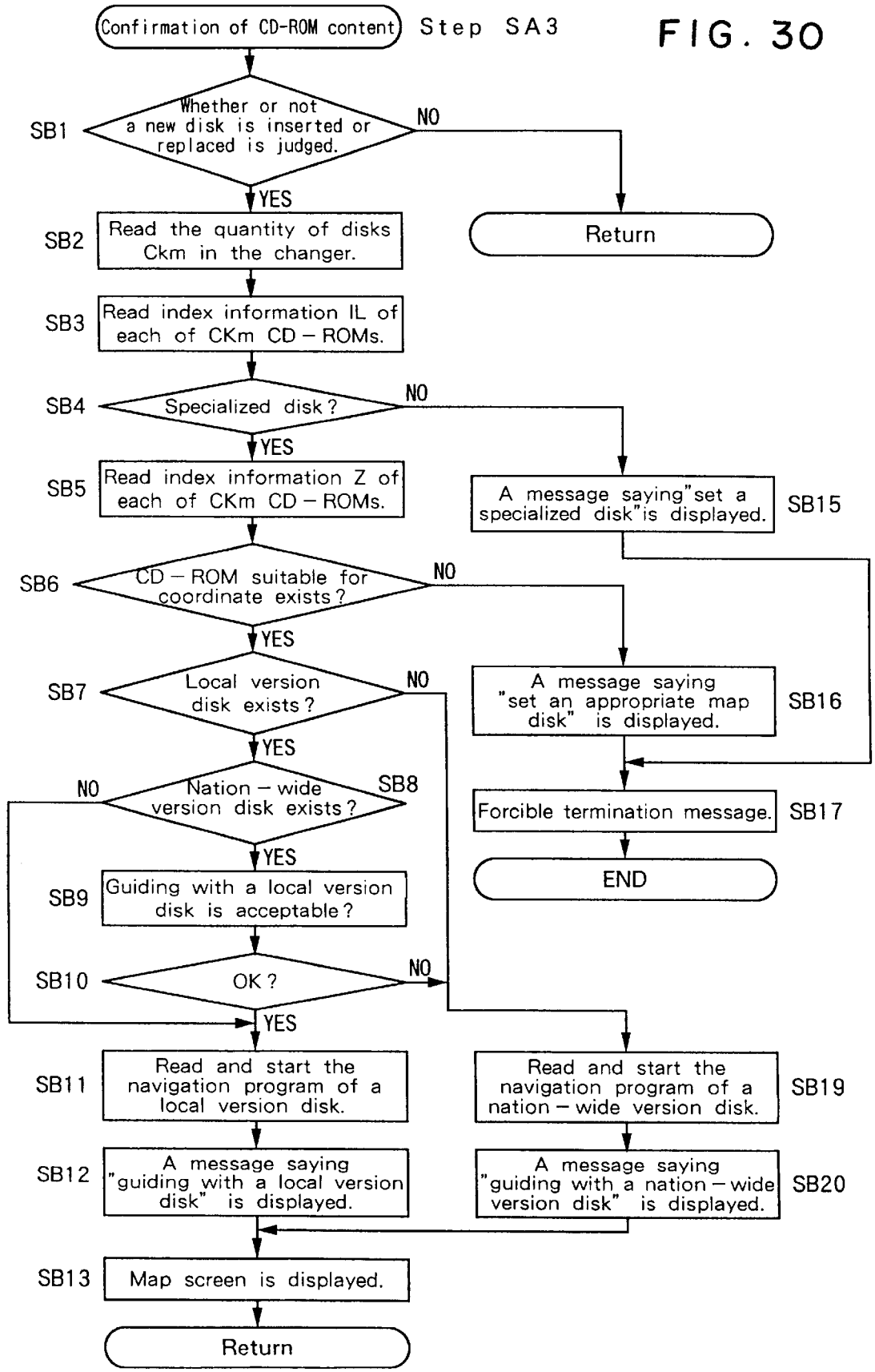
FIG. 30 is a flow chart of a first embodiment of a CD-ROM processing subroutine.

FIG. 30 shows a flow chart of a first embodiment of the "CD-ROM processing" subroutine, step SA3 in the main routine shown in FIG. 29, to be executed by the CPU 40. In this subroutine, the local version CD-ROM 37 is automatically selected in preference to the nation-wide version. This subroutine allows the subsequent "route processing" subroutine (step SA5) which follows in the main routine to be optimally executed.

The subroutine illustrated in FIG. 30 provides for selection of a suitable CD-ROM 37 from among the plural CD-ROMs stored in the changer 5. First, whether the power has been turned on by the CPU 40 or a new CD-ROM 37 has been placed in the changer 5 is judged (step SB1). The judgment as to whether the power is turned on is based on the detected state of the aforementioned navigation system power or of the vehicle start switch. The judgment as to whether a new CD-ROM 37 has been installed in the changer 5 is based on whether or not the changer 5 door is opened or closed and whether a CD-ROM 37 is loaded on a tray thereof. This is detected by a change of the contact switch provided on each tray with a passage of time. More specifically, the CPU of the data transmitting/receiving section 39 monitors the state of the contact switch of each tray at each time interval of a specified duration and if the state of any contact switch has changed, the local CPU of the data transmitting/receiving section 39 transmits information to the CPU 40 through the I/O data bus 28 and the communication interface 47 by a method such as interruption and insertion of a new CD-ROM is thereby detected.

Next, under a command from the CPU 40, the quantity Ckm of the CD-ROMs stored in the changer 5 is judged by the local CPU provided in the data transmitting/receiving section 39 (step SB2). That is, depending on on/off of the contact switch disposed on each tray of the changer 38, whether or not a CD-ROM is contained in the tray is judged. Finally, the quantity of the CD-ROMs stored in the entire changer 5 is determined. Then, the identified numeric data Ckm is stored in the second RAM 6 as the quantity Ckm of the CD-ROMs.

Then, Ckm CD-ROMs 37 in the changer 5 are successively loaded on an optical head of the data transmitting/receiving section 39 by means of a loading device (not shown) disposed in the changer 5. Next, from the photo data file or the destination data file memorized in each of the CD-ROMs 37, information identifying the category (category, purpose or genre) or type is extracted and stored in the first RAM 5 as the index information IL (Ckm) (step SB3).

The major objective of navigation registered for each CD-ROM 37, may be a golf course or a sightseeing location such as shrine or temple, such that the destinations thereof may be diversified. Thus, as described above, the index information IL (Ckm) is extracted from storage data contained in each CD-ROM and the major destination of each CD-ROM is thereby identified.

The CD-ROMs usable in this system include non-navigation specialized disks such as for games, karaoke or the like. The index information IL (Ckm) is also read from such a non-navigation specialized CD-ROM and may be preliminarily stored. That is, in the CD-ROM 37, the index information for judging the category (category, purpose or genre) is stored. Then, the index information of that CD-ROM 37 is copied as the index information IL ( Ckm) within the first RAM 43. Consequently, the index information IL (Ckm) is copied rapidly.

A variable (Ckm) attached to the ending of the index information IL (Ckm) indicates the index information IL is the index information IL read from the Ckm CD-ROM of the CD-ROMs stored in the changer 5. The variable (Ckm) used in the description which follows has the same meaning.

If the reading of the index information IL (Ckm) from Ckm CD-ROMs 37a–37e is completed, the presence of a navigation CD-ROM stored in the changer 5 is determined based on the aforementioned index information IL (Ckm) (step SB4). This is because if the CD-ROM 37 stored in the changer 5 is not a navigation CD-ROM, the navigation operations of route searching and the like cannot be implemented.

Therefore, if it is judged that no navigation CD-ROM 37 is stored in the changer 38 (NO in step SA4), the CPU 40 displays an alarm message saying "Install Navigation Disk" on the screen of the display 12 (step SB15). It is also possible to emit an aural alarm from the speaker 16 together with this displayed alarm message. Then, after a message saying "forcible termination" is displayed on the screen of the display 12, the entire power of the navigation system is automatically turned off (step SB17). This power off processing of step SB17 may be omitted. Instead of this forcible termination, it is permissible to repeat the processing of step SB15 or to return to the main routine of FIG. 29.

If YES is the answer in step SB4, indicating that a navigation CD-ROM 37 disk is stored in the changer 5, each coordinate range 80 m memorized in that navigation CD-ROM 37 is read in the changer 5 and stored in the first RAM 43 as the coordinate range ZP (Ckm) of the CD-ROM 37 (step SB5). That is, the geographical range of road map information stored in the CD-ROM 37 is identified.

Based on the read coordinate range ZP (Ckm) and the current position data MP detected in the aforementioned step SA2, a judgement is made as to whether or not a CD-ROM 37 disk containing road map data including the current position coordinates of the vehicle is present in the changer 5 (step SB6). If a CD-ROM 37 containing the current position coordinates of the vehicle is not present in the changer 5 (NO in step SB6), an alarm message saying "Install a Map Disk of an Appropriate Area" is displayed on the screen of the display 5. That is, the user is informed that no CD-ROM 37 with road map data which can indicate the current position of the vehicle exists in the changer 5 (step SB16). In this case also, it is permissible to issue an audible alarm from the speaker 16.

On the other hand, if a CD-ROM 37 in which road map data including the current position coordinates is present within the changer 5, the routine next determines whether that CD-ROM 37 containing the current position coordinates is a local version (step SB7). This judgment is based on the value of the coordinate range ZP (Ckm). If no local version CD-ROM 37 is present in the changer 5 (NO in step SB7), it is judged that only a nation-wide version CD-ROM 37 is present in the changer 5.

Then, that nation-wide version CD-ROM 37 disk is selected and the program for navigation stored in that nation-wide CD-ROM 37 is read by the data transmitting/receiving section 39 and copied into the program area PL of the first RAM 43 (step SB19). A message reading "Guidance by Nation-wide Version" is then displayed on the screen of the display 12 (step SB20). On the other hand, if any local version CD-ROM 37 is stored in the changer 5, the routine next determines whether or not a nation-wide CD-ROM 37 is also stored in the changer 5 (step SB8). Then, if it is judged that the nation-wide version CD-ROM 37 is also stored in the changer 5, a message reading "Guidance by Local Version is Acceptable?" and the words "YES" and "NO" are displayed (step SB9) and the user is thereby invited to decide whether or not guidance by data of the local version is acceptable (step SB10).

If "approval" by input of "YES" is input by a user through the touch switch 11 or by silent approval through leaving the touch switch inoperative for a specified interval of time (YES in step SB10), a CD-ROM 37 in which a local version road map data is stored is selected from the trays of the changer 5. Then, the navigation program of that local version CD-ROM is copied into the program area PL of the first RAM 43 (step SB11). After that, a message saying "Guidance by Local Version Disk" is displayed on the screen of the display 12 ( step SB12).

However, if "NO" is the answer in step SB10 or other indication of disapproval is input by the user, a nation-wide version CD-ROM 37 in the changer 5 is selected. Then, its program is copied into the program area of the first RAM 43 (step SB19) and a message saying "Guiding by Nation-wide Version" is displayed on the screen of the display 12 (step SB20).

If the program of a CD-ROM 37 is copied into the program area PL in step SB11 or step SB19, the road map or the residential map is displayed on the screen of the display 12 on the basis of the current position data MP of the first RAM 43 so that the current position of the vehicle is located in the center of the screen of the display 12 (step SB13). Then, the "CD-ROM processing" subroutine shown in FIG. 30 is terminated and the processing is returned to the main routine shown in FIG. 29.

As described above, according to this embodiment, the presence of a navigation CD-ROM stored in the changer among a plurality of CD-ROMs 37 is automatically judged and if a navigation CD-ROM 37 is stored, either the nation-wide version or the local version CD-ROM 37 is automatically selected. Thus, the procedures of selecting of the CD-ROM 37 manually and of confirming of the contents of the selected CD-ROM 37 can be eliminated.

Figure 31:
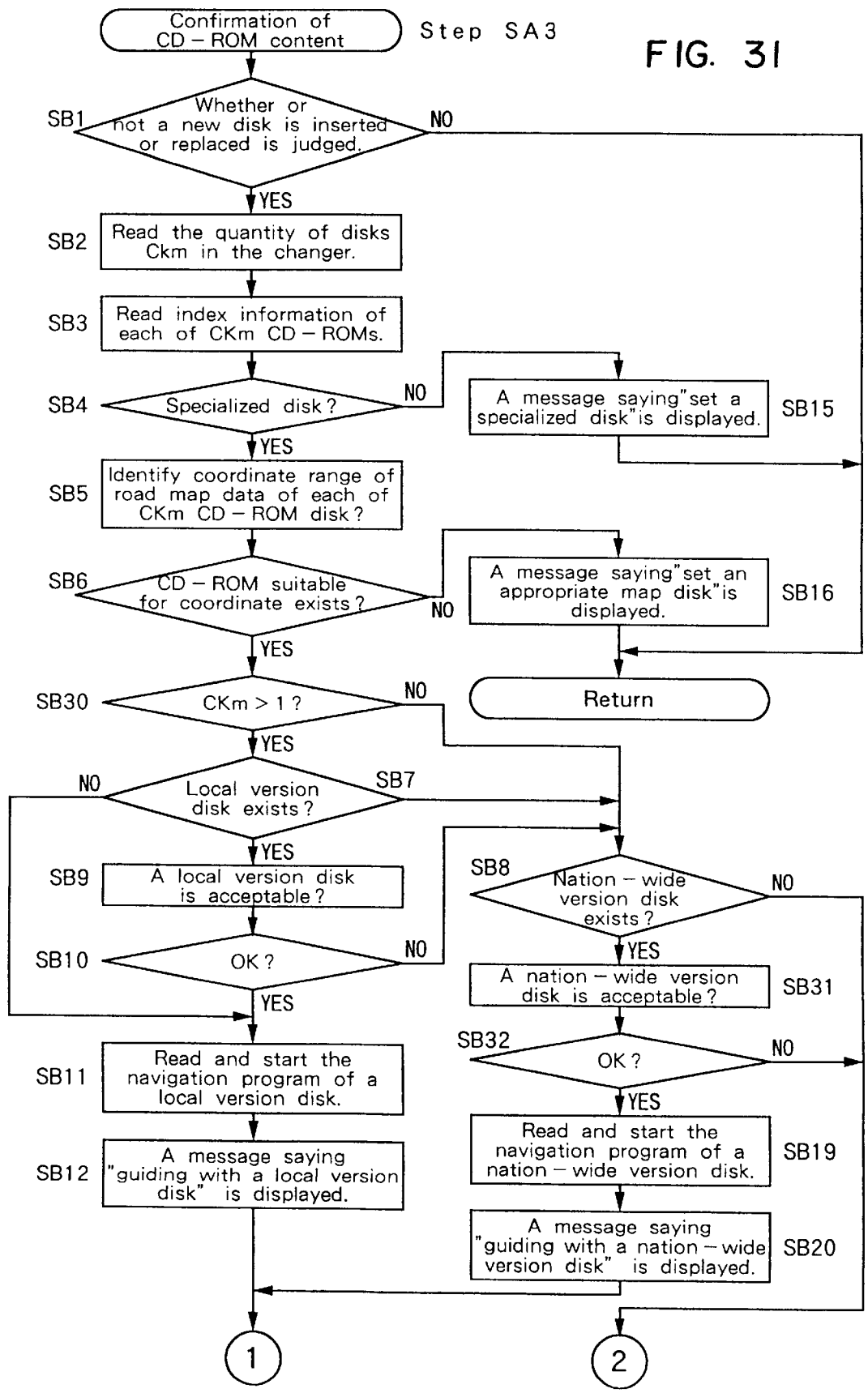
FIG. 31 is a flow chart of a second embodiment of a CD-ROM processing subroutine.
Figure 32:
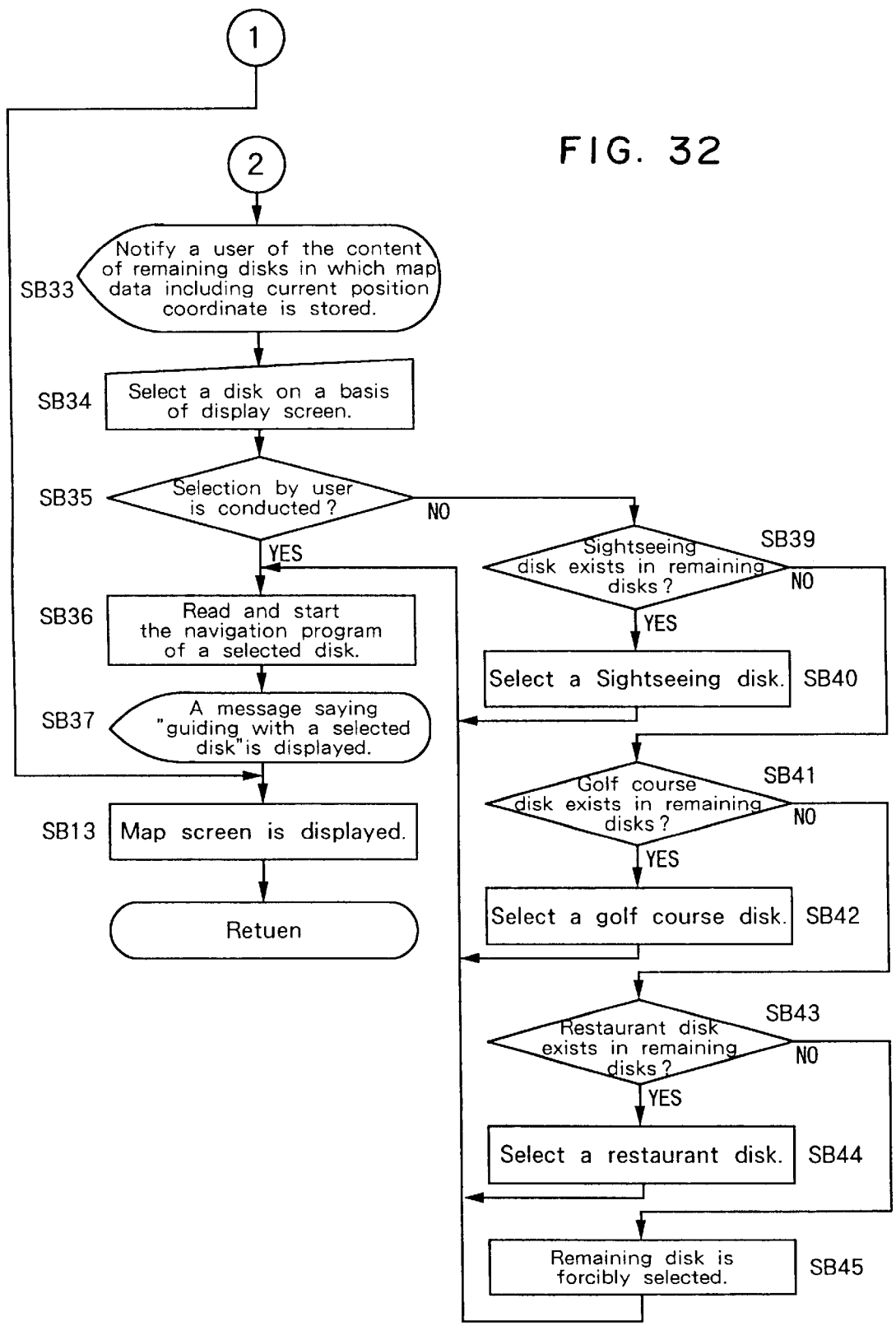
FIG. 32 is a continuation of the flow chart of FIG. 31.

FIG. 31 shows a flow chart of a second embodiment of the "CD-ROM processing" subroutine, step SA3 in the main routine shown in FIG. 29, to be executed by the CPU 40. In this subroutine, the CD-ROMs of respective categories are automatically selected following a specified order of priority. Reference numerals which are the same as in the first embodiment indicate identical process steps.

First, as described above, whether or not the power has been turned on and whether or not a new CD-ROM 37 has been installed in the changer 5 is judged (step SB1). The quantity (Ckm) of the CD-ROMs stored in the changer 5 is judged by the local CPU in the data transmitting/receiving section 39. Next, information concerning the category (category, purpose or genre) or the type of each CD-ROM is extracted and stored in the first RAM 43 as the index information IL (Ckm) (step SB3). Whether or not any navigation CD-ROM 37 is stored in the changer 5 is judged on the basis of the aforementioned index information IL (Ckm) (step SB4).

Next, the coordinate range 80 m indicating the geographical range of the road map data memorized in the CD-ROM 37 is read from each of the navigation CD-ROMs 37 in the changer 5 (step SB5). Whether or not a CD-ROM 37 containing road map data including the current position coordinates of the vehicle is present in the changer 5 is determined (step SB6). If no CD-ROM 37 containing the current position coordinates of the vehicle is present in the changer 5 (NO in step 6), an alarm message "Install a Map Disk of Appropriate Area" is displayed on the screen of the display 12 (step SB16).

In step SB6, if it is judged that a CD-ROM 37 containing road map data including the current position coordinates is present in the changer 5, it is next determined whether or not two or more such CD-ROMs are present in the changer 5 (step SB30). Here, if two or more CD-ROMs are stored therein, whether or not any local version CD-ROM 37 exists in the plurality of the stored CD-ROMs is judged (step SB7). This judgment is conducted using the coordinate range ZP (Ckm).

In step SB7, if it is judged that any local version CD-ROM is stored in the changer 5, a confirmation message "Navigation with Local Version is Acceptable?" and the words "YES" and "NO" are displayed on the screen of the display 12 (step SB9) to invite a user to select YES or NO (step SB10).

If "approval" or "YES" is input by a user through the touch switch 11 or by silent approval indicated by the touch switch 11 remaining inoperative for a specified interval of time (YES in step SB10), a CD-ROM 37 in which a local version road map data is stored is selected from the trays of the changer 5. Then, the navigation program of the selected CD-ROM is copied into the program area PL of the first RAM 43 (step SB11). After that, a message "Guidance by Local Version Disk" is displayed on the screen of the display 12 (step SB12).

If the navigation program of a local version CR-ROM 37 is copied into the program area PL of the first RAM 43, the road map or the residential map is displayed on the screen of the display 12 on the basis of the current position data MP of the first RAM 43 so that the current position of the vehicle is located in the center of the screen of the display 12 (step SB13 in FIG. 10). Then, the "CD-ROM processing" subroutine is terminated and the processing is returned to the main routine shown in FIG. 29.

On the other hand, even if the quantity Ckm of the CD-ROMs in the changer 5 is 1 (NO in step SB6) or if, although a plurality of the CD-ROMs 37 are stored in the changer 5, no local version CD-ROM is among that plurality of the CD-ROMs 37 (NO in step SB7) or if NO is the answer in step 10, namely "NO" or "disapproval" is input by the user, whether or not a remaining CD-ROM 37 in the changer 5 is a nation-wide version CD-ROM is judged (step SB8).

If a nation-wide version CD-ROM 37 is present in the changer 5 (YES in step SB8), to ask the user whether or not the navigation operation may be executed using this nation-wide version CD-ROM 37, a message "Nation-wide Version Disk is Acceptable?" is displayed on the screen of the display 12 (step SB31)

In response to this indication, if the user inputs "YES" indicating approval through the touch switch 11 or a silent approval by the touch switch 11 remaining inoperative for a specified interval of time (YES in step SB32), the nation-wide version CD-ROM 37 is selected in the changer 5. Then, the navigation program stored in this nation-wide version CD-ROM 37 is read by the data transmitting/receiving section 39 and copied into the program area PL of the first RAM 43 ( step SB19). Then, a message "Guiding with Nation-wide Version" is displayed on the screen of the display 12 (step SB20).

If the navigation program of the nation-wide version CD-ROM 37 is copied into the program area PL of the first RAM 43, the road map or the residential map is displayed on the screen of the display 12 on the basis of the current position data MP of the first RAM 43 so that the current position of the vehicle is located in the center of the screen of the display 12 (step SB13 in FIG. 10). Then, the "CD- ROM processing" subroutine is terminated and the processing returns to the main routine shown in FIG. 29.

However, If NO is the answer in step SB8 or step SB32, index information IL of each of the remaining CD-ROMs 37 in the changer 5, which contain road map data including the current position coordinates, is displayed on the display 12 (step SB33 in FIG. 10). This is the case where one or more CD-ROMs 37 are stored in the changer 5 and further the user does not want navigation processing by either the local version CD-ROM 37 or the nation-wide version CD-ROM 37.

This displayed index information IL identifies the category of each of the navigation CD-ROMs 37 remaining in the changer 5. For example, if two CD-ROMs 37 whose main purpose is navigation to, respectively, a "golf course" and "sightseeing" are present, a message "golf CD-ROM 37 remains" or "sightseeing CD-ROM remains" or the like is displayed on the screen of the display 12 and output audibly.

The user then operates the touch switch 11 to input a command selecting the desired CD-ROM 37 (step SB34). Whether or not there has been a selection by the user is judged depending on operation of the touch switch 11 (step SB35). If the touch switch 11 has been operated and a command for selection is input (YES in step SB35), a CD-ROM 37 corresponding to the selected category is selected by the changer 5. After that, the navigation program is copied from that selected CD-ROM 37 into the program area PL of the first RAM 43 (step SB36) and a message "Guidance by a Selected Application Disk" is displayed on the screen of the display 12 (step SB37).

If the navigation program is copied into the program area PL of the first RAM 43, on the basis of the current position data MP of the first RAM 43, a road map or residential map is displayed on the screen of the display 33 such that the current position of the vehicle is in the center of the display 12 (SB13 in FIG. 10). Then, this "CD-ROM processing" subroutine is terminated and the processing is returned to the main routine in FIG. 29.

However, if NO is the answer in step SB35 or if there has been no selection by the user, an arbitrary CD-ROM 37 is selected from the remaining CD-ROMs 37 in the changer 5. Namely, whether or not a sightseeing CD-ROM 37 whose navigation objective is a sightseeing spot such as a shrine, temple or the like exists among the remaining CD-ROMs stored in the changer 5 is judged (step SB39). If a sightseeing CD-ROM 37 is present, that sightseeing CD-ROM 37 is selected (step SB40).

However, if no sightseeing CD-ROM 37 is present (NO in step SB39), whether or not any golf CD-ROM 37, whose main navigation objective is a golf course, is among the remaining CD-ROMs is judged (step SB41). If a golf CD-ROM 37 exists, that golf CD-ROM 37 is selected (step SB42).

Further, if no golf CD-ROM 37 exists (NO in step SB41), whether or not a restaurant CD-ROM 37 whose main navigation objective is an eating facility, such as a restaurant or the like, is present among the remaining CD-ROMs is determined (step SB43). If a restaurant CD-ROM 37 is present, that restaurant CD-ROM 37 is selected (step SB44). However, if the category of a CD-ROM 37 remaining in the changer 5 is not restaurants (NO in step SB43), that remaining CD-ROM 37 is nevertheless selected (step SB45).

As described above, as to the CD-ROMs 37 remaining in the changer 5, depending on the category (category, purpose, or genre), presence or absence of a corresponding CD-ROM 37 is judged in order of sightseeing category, golf category, and restaurant category, and if a CD-ROM for each category exists, that CD-ROM 37 is selected. However, if the aforementioned three types of CD-ROMs do not exist in the changer 5 and a CD-ROM of another category is present therein, that remaining CD-ROM 37 is selected. The order of preference for steps SB39–SB44 is not restricted to that described above, i.e. the order of priority is not restricted to sightseeing, golf and restaurant. It is also permissible to add a CD-ROM 37 for another category.

If an arbitrary CD-ROM 37 is selected in steps SB39–SB45, the navigation program is copied from that selected CD-ROM 37 into the program area PL of the first RAM 43 (step SB36). Then, a message "Guidance with Selected Disk" is displayed on the screen of the display 12 (step SB37). Further, on the basis of the current position data MP of the first RAM 43, a road map or residential map is displayed on the screen of the display 12 with the current position of the vehicle located in the center of the screen of the display 12 (step SB13). This "CD-ROM processing" subroutine is then terminated and operation returns to the main routine shown in FIG. 29.

As described above, according to this embodiment, whether or not a navigation CD-ROM 37 is contained in the changer among a plurality of CD-ROMs 37 contained therein is automatically judged and if a navigation CD-ROM 37 is present, particular CD-ROMs 37 of respective categories are automatically selected according to an order of preference. Thus, the necessity of the user selecting a CD-ROM 37 manually and confirming the contents of the selected CD-ROM is eliminated thereby enabling more comfortable use of the navigation system.

Figure 33:
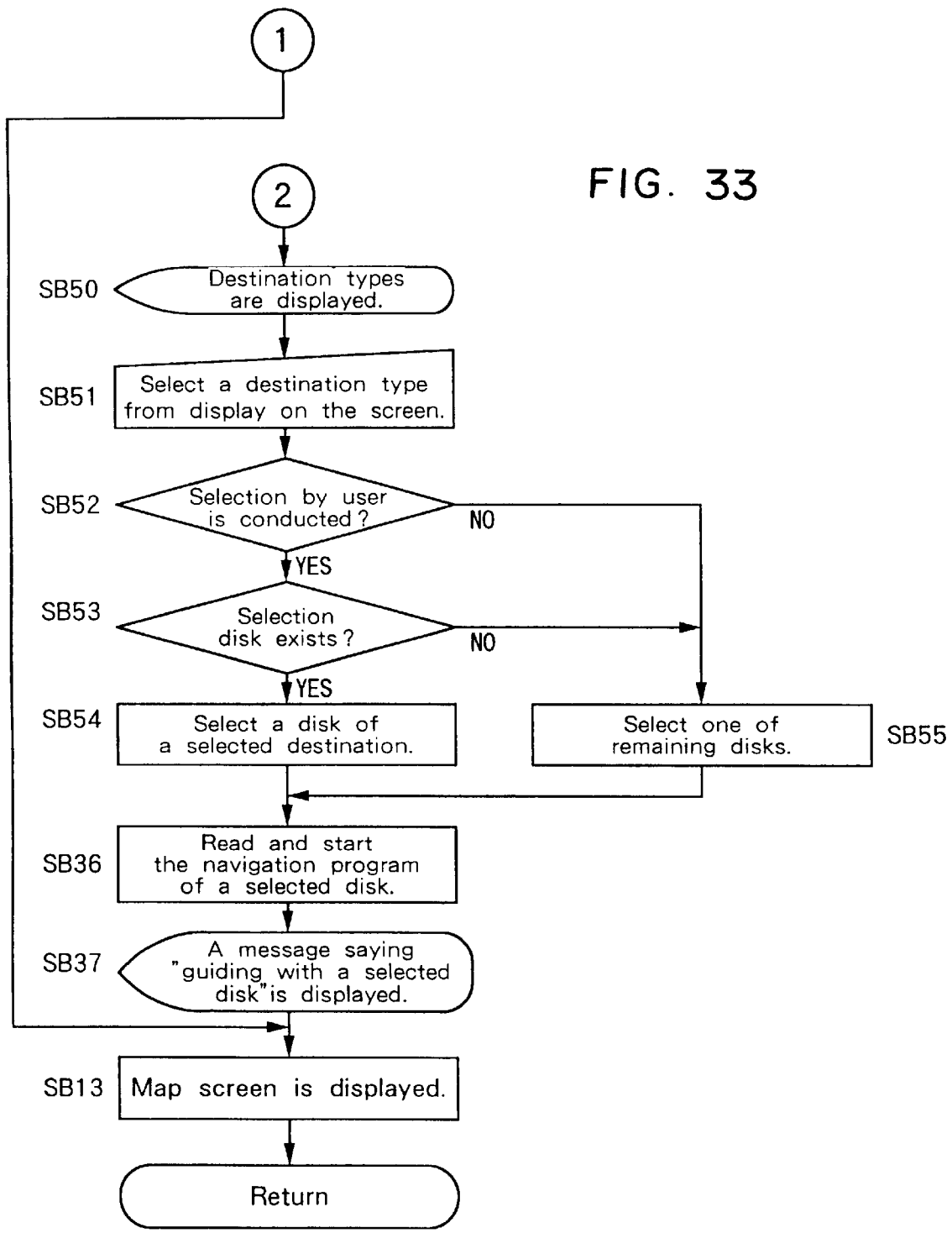
FIG. 33 is a flow chart of a third embodiment of a CD-ROM processing subroutine.

FIG. 33 shows a partial flow chart of a third embodiment of the "CD-ROM processing" subroutine, step SA3 in the main routine shown in FIG. 29, to be executed by the CPU 40. In this subroutine, a CD-ROM 37 depending on the category (category, purpose or genre) of a set destination is automatically selected. The remainder (first half) of the routine of the third embodiment is the same as that of the second embodiment shown in FIG. 31. Because the portion of the routine of the third embodiment shown in FIG. 31 is the same as the second embodiment, a description thereof is omitted. Additionally, in FIG. 33, reference numerals which are the same as in the first and second embodiments denote identical operative steps.

If NO is the answer in step SB8 or in step SB32 in FIG. 31, the approximate content and type of the destination is displayed on the screen of the display 12 (step SB50). For example, a message "Is Your Destination a Golf Course?" or "Is Your Destination a Sightseeing Location?" is displayed. That is, the user is urged to input the approximate content of a destination. If NO is the answer to the above question, this means that no nation-wide version CD-ROM 37 is present among the CD-ROMs remaining in the changer 5 or, even if a nation-wide version CD-ROM 37 exists, the user does not permit use of the nation-wide version CD-ROM, as well as not permitting use of the local version CD-ROM 37.

Depending on the screen of the display 12, the user operates the touch switch 11 and whether or not the type of a destination is selected is judged from the outline of the displayed destination (step SB52). If YES is answered in this step SB52 or if a selection is made by the user, whether or not a CD-ROM corresponding to the selected type of the destination exists in the changer 5 is judged (step SB53).

If an appropriate CD-ROM 37 exists in the changer 5 (YES in step SB53), this appropriate CD-ROM 37 is moved to a position in which it can be read by the data transmitting/ receiving section 39 in the changer 5 (step SB54). That is, selection of the CD-ROM 37 is executed. Then, the navigation program is copied from the selected CD-ROM 37 into the program area PL of the first RAM 43 (step SB36) and a message "Guidance with a Selected Application Disk" is displayed on the screen of the display 12 (step SB37).

If the navigation program is copied into the program area PL of the first RAM 43, on the basis of the current position data MP of the first RAM 43, a road map or residential map is displayed on the screen of the display 12 such that the current position of the vehicle is in the center of the display 12 (step SB13). Then, this "CD-ROM processing" subroutine is terminated and the processing is returned to the main routine shown in FIG. 29.

If NO is answered in step SB52 and in step SB53 or if the user does not enter an approximate destination or if, even with entry of an approximate destination by the user, the CD-ROM 37 which covers the approximate destination does not exist in the changer 5, a single CD-ROM is forcibly selected from the CD-ROMs 37 remaining in the changer 5 (step SB55).

Although this selected CD-ROM 37 is, of course, a navigation CD-ROM37, the type is not specified. Thus, the CD-ROM 37 on the topmost tray of the remaining CD-ROMs 37 is sometimes selected.

The CD-ROM 37 to be selected forcibly may be a local version or a nation-wide version CD-ROM 37.

After this forcible selection from the remaining CD-ROMs, the navigation program is copied from that CD-ROM 37 into the program area PL of the first RAM 43 (step SB36) and further, a message "Guidance with a Selected Disk" is displayed on the screen of the display 12 (step SB37). Then, on the basis of the current position data MP of the first RAM 5, a road map or residential map is displayed on the screen of the display 12 such that the current position of the vehicle is in the center of the display 12 (step SB13). After that, this "CD-ROM processing" subroutine is terminated and then the processing returns to the main routine shown in FIG. 29.

Meanwhile, the setting and judgment of the category of the destination in steps SB50–B52 may be decided on the basis of the genre (category, purpose or genre) of the selected destination and set in the aforementioned step SA4. The genre are as previously described.

Genre is determined by selection of a destination when the destination is determined in step SA4. This type of genre determination is described in detail in the specifications and drawings of Japanese Patent No. Sho 6-329132 and Japanese Patent No. Sho 7-188014, the teachings of which are incorporated by reference herein. A CD-ROM 37 corresponding to a genre determined in this manner is selected in the aforementioned step SB54. Additionally, whether or not the field, purpose or genre of the destination has been set in the aforementioned step SB50 is also judged. Further, this "destination" may be either an intermediate stop or guidance final point as indicated by data ED or the like. Also, the current position judged in the aforementioned step SB6 may be the guidance start point indicated by data SP.

As described above, according to the present invention, whether or not a navigation CD-ROM 37 is present in the changer among the plurality of the CD-ROMs 37 stored therein is automatically judged and if a navigation CD-ROM 37 is stored, a CD-ROM 37 corresponding to the category of a set destination is automatically selected. Thus, the selecting of the CD-ROM 37 manually by the user and the confirming of the content of the selected CD-ROM 37 is eliminated so that it is possible to more comfortably start the navigation operation.

Figure 34:
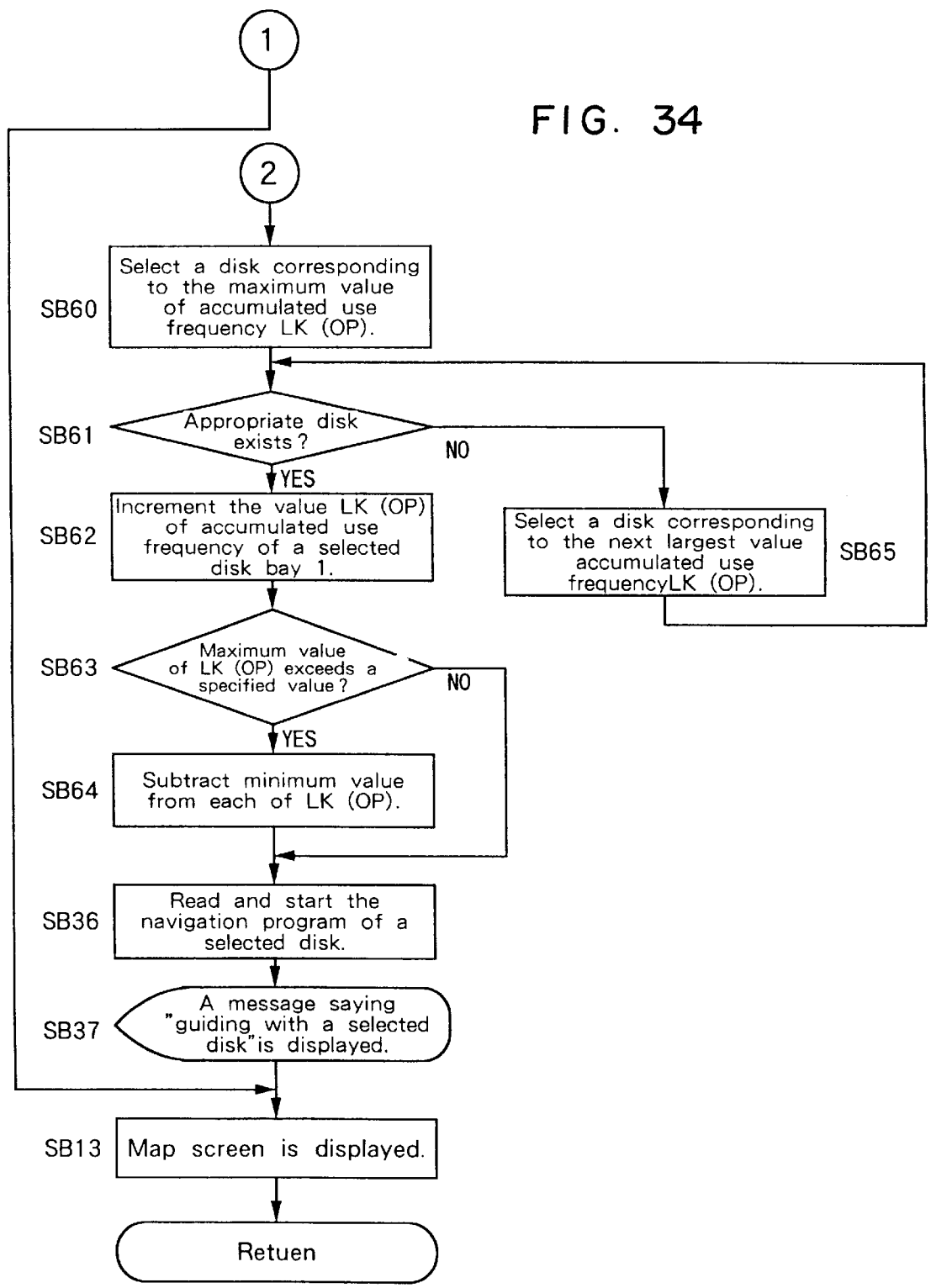
FIG. 34 is a flow chart of a fourth embodiment of a CD-ROM processing subroutine.

FIG. 34, in conjunction with FIG. 31, is a flow chart of a fourth embodiment of the "CD-ROM processing" subroutine which is step SA3 in the main routine shown in FIG. 29 to be executed by the CPU 40 of the navigation system of the present invention. In this subroutine, depending on the frequency of use each of the CD-ROMs 37, a CD-ROM 37 is automatically selected. The former half of the subroutine of this fourth embodiment is the same as in the above described second embodiment illustrated in FIG. 31. Because the portion of this subroutine shown in FIG. 31 is the same as in the aforementioned second embodiment, description thereof is omitted. Additionally, in this FIG. 34, the reference numerals which are the same as in the above-described first to third embodiments designate identical steps.

If NO is answered in step SB8 or in step SB32 in FIG. 31, a CD-ROM 37 of an application variable (OP) having the maximum value for accumulated use frequency LK (OP) is selected (step SB60). If NO is the answer, it means that no nation-wide version CD-ROM 37 exists among the CD-ROMs 37 remaining in the changer 5 or that a nation-wide version CD-ROM 37 exists but the user has not permitted use of either that nation-wide version CD-ROM 37 or a local version CD-ROM 37. In this case, a CD-ROM 37 corresponding to an application variable (OP) having the maximum value for accumulated use frequency LK, among the accumulated use frequencies LK (OP) memorized in the second RAM 6, is selected in the changer 5 (step SB60). Selection of the CD-ROM 37 corresponding to this application variable (OP) is carried out using index information IL (Ckm).

That is, a CD-ROM 37 for a destination which has been used most frequently is automatically selected. Further, whether or not the CD-ROM 37 corresponding to the destination which was used most frequently is present in the changer 5 is judged (step SB61). If the CD-ROM 37 having the highest use frequency is not in the changer 5 (NO in step SB61), a CD-ROM 37 having the second highest use frequency is selected (step SB65). Then, whether or not the CD-ROM 37 having the second highest use frequency is in the changer 5 is judged again (step SB61). In this manner, the CD-ROM 37 in the changer 5 which has the highest use frequency is preferentially selected.

Then, the accumulated use frequency LK (OP) of the application variable OP corresponding to the type of the destination of the selected CD-ROM 37 is incremented by 1 (step SB62). Whether this accumulated use frequency LK(OP) incremented by 1 has reached the maximum value which can be memorized in the second RAM 41 is judged (step SB63). If the maximum value is reached, the smallest value accumulated use frequency LK of the accumulated use frequencies LK(OP) is subtracted from each of the accumulated use frequencies LK (OP) (step SB64). Consequently, overflow of the accumulated use frequency LK (OP) is prevented. In this case, it is also permissible to subtract an arbitrary value such as "2", "3" "4", . . . from each of the accumulated use frequencies LK (OP).

The navigation program is then copied from the selected CD-ROM 37 into the program area PL of the first RAM 43 (step SB36). Further, a message "Guidance with a Selected Application Disk" is displayed on the screen of the display 12 (step SB37).

Then, on the basis of the current position data MP of the first RAM 43, a road map or residential map is displayed on the screen of the display 12 in a manner that the current position of the vehicle is in the center of the display 12 (step SB13). This "CD-ROM processing" subroutine is then terminated and the processing is returned to the main routine shown in FIG. 29.

If all the accumulated use frequencies LK (OP) are "0", it is permissible in step SB60 to forcibly select the topmost navigation CD-ROM 37 in the changer 5, other than the local version or the nation-wide version CD-ROM 37.

It is also possible to substitute the processing of steps SB39–SB45 in the aforementioned second embodiment for the processing shown in FIG. 34 in the fourth embodiment. As a result in the second embodiment, after it has been determined that no local version or nation-wide version CD-ROM 37 can be selected, if the user does not select a CD-ROM 37 corresponding to the approximate content of one of the remaining CD-ROMs as displayed on the display 12, the accumulated use frequency LK (OP) used in the fourth embodiment is utilized and the CD-ROM 37 having the highest use frequency is automatically selected.

Although either a local version CD-ROM or the nation-wide version CD-ROM 37 is described as selected in the first embodiment, automatic selection of the CD-ROM 37 using the accumulated use frequency LK (OP) as in the fourth embodiment, instead of the local version or nation-wide version, may be executed. As a result, the use frequencies of the local version CD-ROMs, the nation-wide version CD-ROMs, CD-ROMs of respective categories and all types of CD-ROMs are taken into account, so that an appropriate CD-ROM 37 is automatically selected.

As described above, according to the present invention, whether or not a navigation CD-ROM 37 is present among the plurality of the CD-ROMs 37 stored in the changer is automatically judged and if a navigation CD-ROM 37 is stored, an appropriate CD-ROM 37 is automatically selected from the plurality of the CD-ROMs 37 on the basis of the previous use frequencies of the CD-ROMs. Thus, the procedures of selecting the CD-ROM 37 manually by the user and the confirming of the content of the selected CD-ROM 37 are eliminated so that it is possible to more comfortably start the navigation operation.

The present invention is not restricted to the foregoing embodiments but may be modified in various forms. For example, the destination to be processed in step SB50 and SB51 may be either a stop-over location or the guidance final point identified by data ED or the like. Further, the current position determined in step SB6 may be the guidance start point identified by data SP.

Further, in each of the above described embodiments, the navigation program is read from the CD-ROM 37, written into the first RAM 43 and executed by the CPU 40. However, as is conventional, it is permissible that this data be memorized preliminarily in the first ROM 49 so that for any CD-ROM 37, the navigation operations such as route searching are executed with the same program.

However, by providing a construction wherein an updated program is loaded into the first RAM 43 as described in connection with each of the above-described embodiments, even if the road map data construction method for a CD-ROM 37 is changed in the future so that such an updated version cannot be used effectively with the exiting program (s), that updated data can be used effectively by rewriting the CD-ROM program.

Further, if all the screen indication data such as symbols for various information transmission, as displayed on the screen of the display 12, are memorized in the CD-ROM 37, when a new program is read in one of the described embodiments, the screen indication data is copied into the RAM altogether, so that it is always possible to execute the updated screen display method.

Additionally, while in each of the above-described embodiments the coordinate range ZP (Ckm) written into the first RAM 43 is copied from the coordinate range 80 m preliminarily memorized in the CD-ROM 37, the coordinate range ZP (Ckm) may also be determined by arithmetic operation based on the road map data in the CD-ROM 37.

Although the first ROM 49 and the second ROM 42 have been described for convenience, it is also permissible to use a single ROM. Further, the type of the first RAM 43 is not restricted and may be a dynamic RAM, a static RAM or a readable/writable RAM such as a memory card. In addition, in the current position detection unit 2, one or two of the GPS receiver unit 21, the beacon receiver unit 22 and the data receiver unit 23 may be omitted. The printer 13 may also be omitted.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A navigation system for conducting route searching and for providing route guidance to a destination, said navigation system comprising:

current position detection means for detecting a current position of a vehicle;

a replaceable information storage unit for storing map information;

destination input means for inputting the destination;

output means for outputting route guidance information for guiding travel; and central processing means for executing the route search to determine a route to the destination based on the map information stored in said information storage unit, for obtaining route information for guidance along the route determined by the route search, for storing the retrieved route information, for outputting signals to the output unit for execution of route guidance for travel according to the determined route, for detecting replacement of said replaceable information storage unit by another information storage unit, for determining if route guidance to the destination has been completed and, in response to detection of the replacement of said replaceable information storage unit and a determination that guidance to the destination along the determined route has not been completed, for conducting a new route search to the destination based upon the map information in the another information storage unit.

2. A navigation system according to claim 1 wherein said replaceable information storage unit contains a program, wherein said central processing means includes an internal storage means for storing the program read from said replaceable information storage unit, and wherein said central processing means, responsive to replacement of the replaceable information storage unit with the another information storage unit containing a different program, reading and storing the different program in said internal storage means.

3. A navigation system according to claim 2 further comprising condition input means for inputting a search condition and wherein said central processing means executes the new route search based on the input search condition.

4. A navigation system according to claim 1 further comprising:
- an internal storage medium included within said central processing means;
- condition input means for inputting a search condition for storage in said internal storage medium; and
- wherein said new route search is executed by said central processing means based on the stored search condition.

5. A navigation system in which a route to an input destination is searched and route guidance is carried out following the searched route, said navigation system comprising:
- a plurality of map information storage means each containing at least one portion of stored map information for conducting route guidance following said route and external information of a plan-view shape and a three-dimensional shape of buildings and internal information relating to the buildings;
- range information extracting means for extracting the geographical coordinate range of said map information from each of the plurality of the map information storage means;
- current position detecting means for detecting the current position coordinates of a vehicle;
- map information selecting means for selecting at least one of the plurality of map information storage means in which the current position coordinates detected by the current position detecting means is contained based upon the geographical coordinate range extracted by the range information extracting means from said plurality of the map information storage means; and
- read/display means for reading said map information from said at least one map information storage means selected by said map information selecting means and displaying said map information.

6. A navigation system in which a route to an input destination is searched and route guidance is carried out following the searched route, said navigation system comprising:
- a plurality of map information storage means each containing at least one portion of stored map information with geographical coordinates for conducting route guidance following said route;
- range information extracting means for extracting a geographical coordinate range of said map information from each of the plurality of the map information storage means;
- use frequency accumulating means for accumulating a use frequency of each of said map information storage means;
- map information selecting means for selecting one map information storage means of the plurality of map information storage means based upon a highest use frequency accumulated by said use frequency accumulating means; and
- read/display means for reading said map information from said one map information storage means selected by said map information selecting means and displaying said map information.

7. A navigation system according to claim 6 wherein said map information selecting means conducts said selection when the power of the navigation system is turned on and when said map information storage means is loaded or replaced.

* * * * *

UNITED STATES PATENT AND TRADEMARK OFFICE
CERTIFICATE OF CORRECTION

PATENT NO. : 5,944,768
DATED : August 31, 1999
INVENTOR(S) : ITO et al

It is certified that error appears in the above-identified patent and that said Letters Patent is hereby corrected as shown below:

Col. 19, line 14, "7" should read –37b–.

Col. 24, line 20, "SAS" should read –SA5–.

Col. 25, line 20, after "information" insert –IL.-- and after "IL" begin a new paragraph.

Col 27, line 25, "bus" should read –base–.

Col. 35, line 62, "exiting" should read –existing–.

Signed and Sealed this

Eighth Day of May, 2001

*Attest:*

NICHOLAS P. GODICI

*Attesting Officer*  Acting Director of the United States Patent and Trademark Office